US012210581B2

(12) United States Patent
Lackner et al.

(10) Patent No.: US 12,210,581 B2
(45) Date of Patent: *Jan. 28, 2025

(54) OPTIMIZED SAMPLING OF RESOURCE CONTENT DATA FOR SESSION RECORDING UNDER COMMUNICATION CONSTRAINTS BY INDEPENDENTLY CAPTURING AGENTS

(71) Applicant: Dynatrace LLC, Waltham, MA (US)

(72) Inventors: Bernhard Lackner, Linz (AT); Jordi Masramon, Barcelona (ES); Otmar Ertl, Linz (AT)

(73) Assignee: Dynatrace LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,213

(22) Filed: Oct. 18, 2023

(65) Prior Publication Data

US 2024/0119103 A1    Apr. 11, 2024

Related U.S. Application Data

(63) Continuation of application No. 17/993,015, filed on Nov. 23, 2022, now Pat. No. 11,860,678.

(60) Provisional application No. 63/296,283, filed on Jan. 4, 2022, provisional application No. 63/283,754, filed on Nov. 29, 2021.

(51) Int. Cl.
*G06F 16/95*  (2019.01)
*G06F 16/9535*  (2019.01)
*G06F 16/957*  (2019.01)
*G06F 16/958*  (2019.01)

(52) U.S. Cl.
CPC ...... *G06F 16/9577* (2019.01); *G06F 16/9535* (2019.01); *G06F 16/958* (2019.01); *G06F 16/972* (2019.01)

(58) Field of Classification Search
None
See application file for complete search history.

(56) References Cited

U.S. PATENT DOCUMENTS 6,418,471 B1 *  7/2002  Shelton ................ G06F 16/954
                                                        709/227
9,356,842 B2    5/2016  Greifeneder et al.
(Continued)

*Primary Examiner* — Maikhanh Nguyen
(74) *Attorney, Agent, or Firm* — Harness, Dickey & Pierce, P.L.C.

(57) ABSTRACT

A technology for the optimized capturing of resource file content for resources referred in recorded user interaction sequences is disclosed. Individual resource files are typically referred in multiple recorded resources, therefore it is desired to capture those resources only once and reuse them for all recorded session capturing them. As user interaction sequences are executed and captured in independently operating web-browsers, a direct coordination between recording web-browsers to avoid multiple captures of the same resource is not possible. Data about the global resource capturing and demand situation is generated on a monitoring server that receives all session recording data and transferred to session recording browsers in form of lists identifying resources that are referred in sessions but are still unresolved and should therefore be captured, and for resources that should not captured, because they are already available and capturing them again should be avoided.

25 Claims, 13 Drawing Sheets

System Overview – Browser Side

(56) References Cited

U.S. PATENT DOCUMENTS

| | | |
|---|---|---|
| 9,571,591 B2 * | 2/2017 | Greifeneder .......... H04L 67/535 |
| 9,766,769 B1 * | 9/2017 | Webber ................... G06F 40/14 |
| 9,927,947 B1 | 3/2018 | Webber et al. |
| 10,846,193 B2 | 11/2020 | Lackner et al. |
| 11,182,537 B2 * | 11/2021 | Lackner .................. G06F 40/14 |
| 11,184,406 B1 | 11/2021 | Shashank |
| 11,863,632 B2 * | 1/2024 | Lackner .............. G06F 11/3079 |
| 2007/0050844 A1 * | 3/2007 | Lebel .................. G06F 11/3414 |
| | | 726/13 |
| 2013/0185643 A1 | 7/2013 | Greifeneder et al. |
| 2014/0195858 A1 * | 7/2014 | Cohen ................. G06F 11/3672 |
| | | 714/38.14 |
| 2017/0019489 A1 * | 1/2017 | Churchill ........... G06Q 30/0201 |
| 2018/0173375 A1 | 6/2018 | Webber et al. |
| 2019/0171542 A1 * | 6/2019 | Lackner .............. G06F 11/3006 |

\* cited by examiner

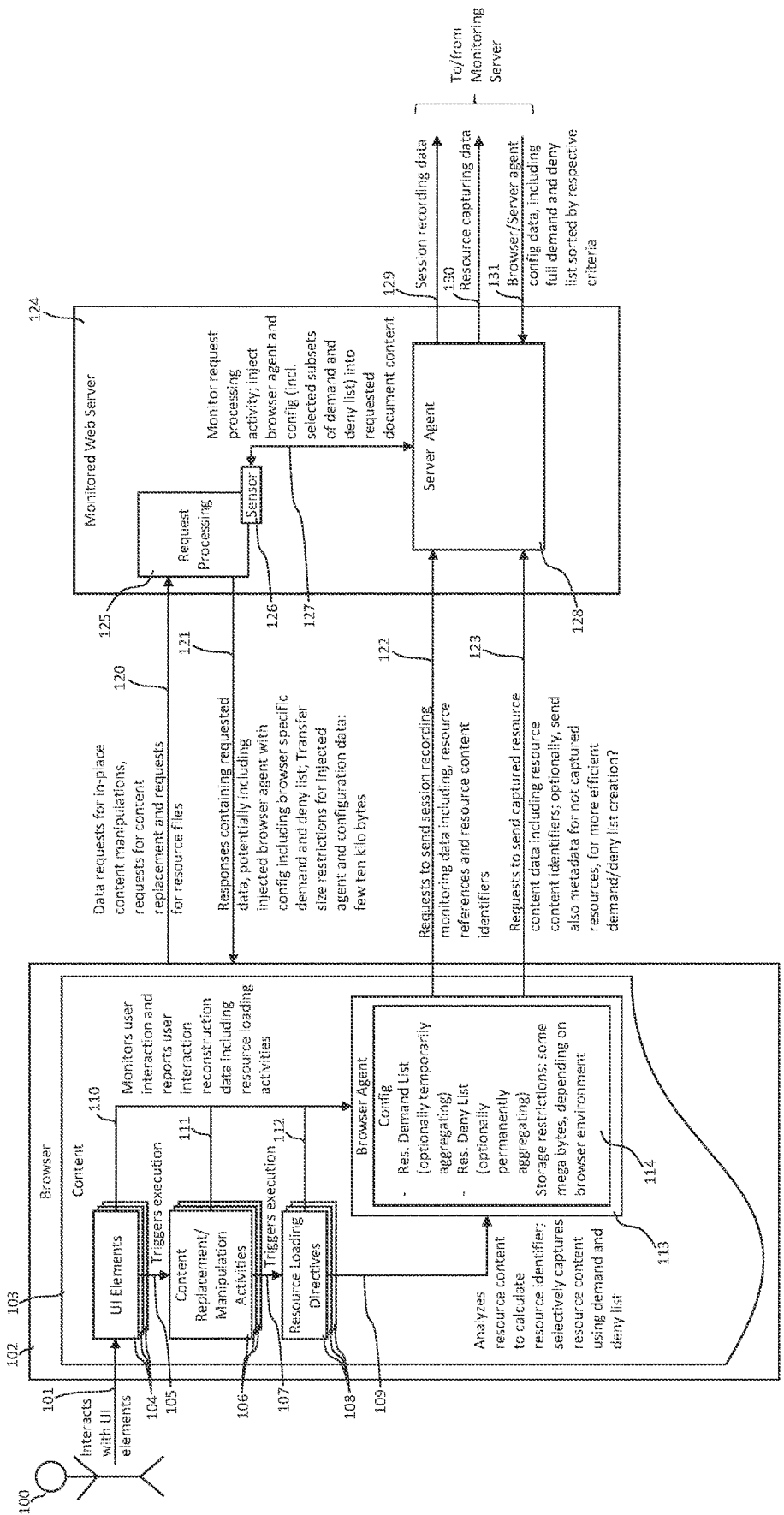
FIG 1a: System Overview – Browser Side

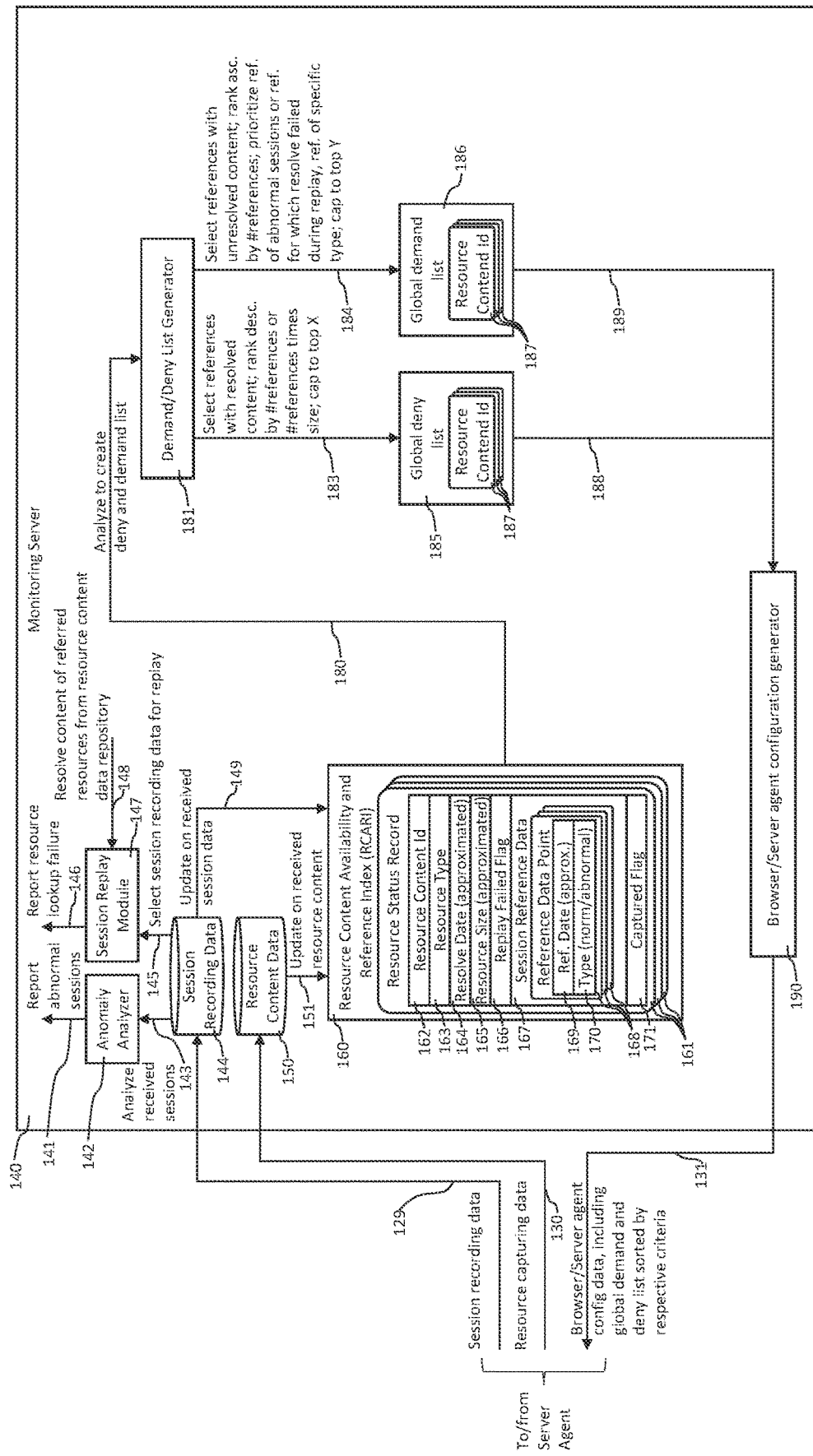
FIG 1b: System Overview — Monitoring Server Side

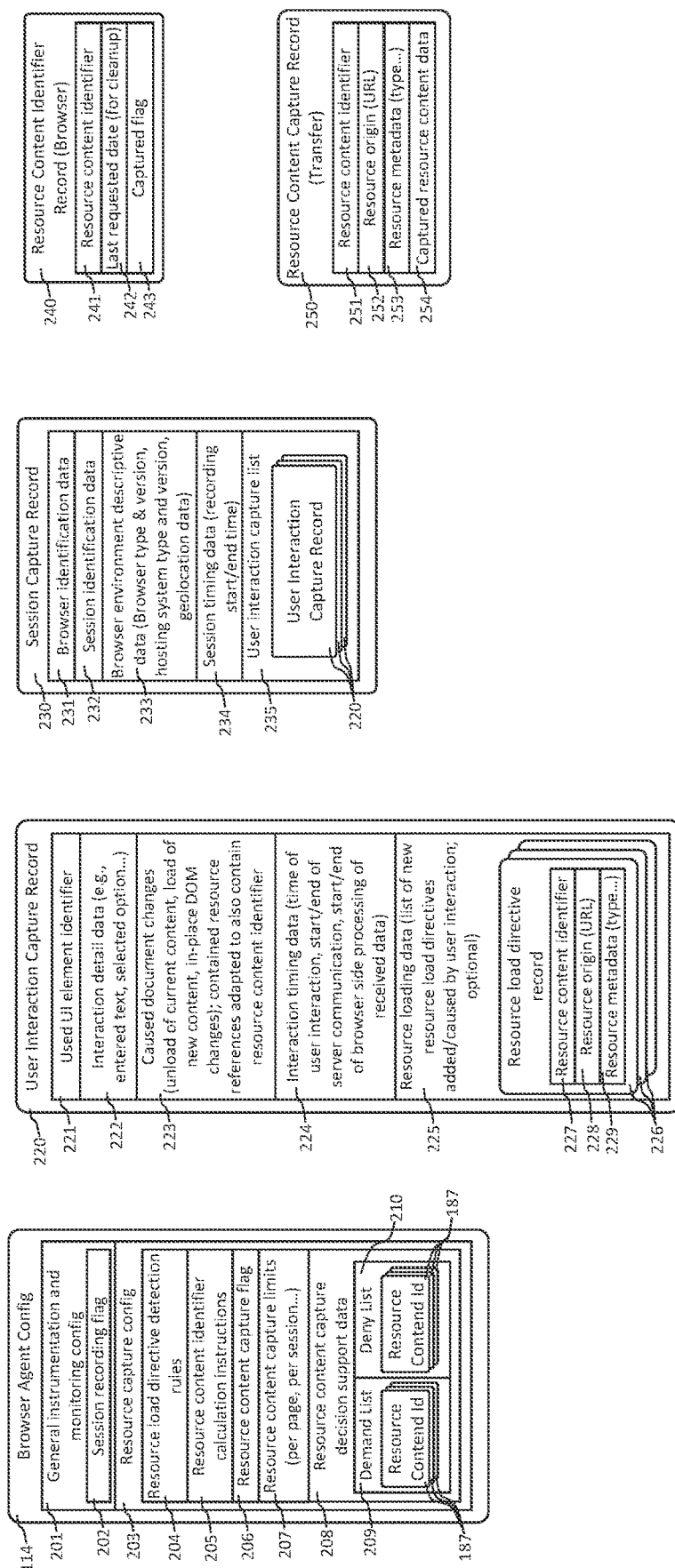
FIG. 2: Monitoring Activity Configuration and Monitoring Data Records

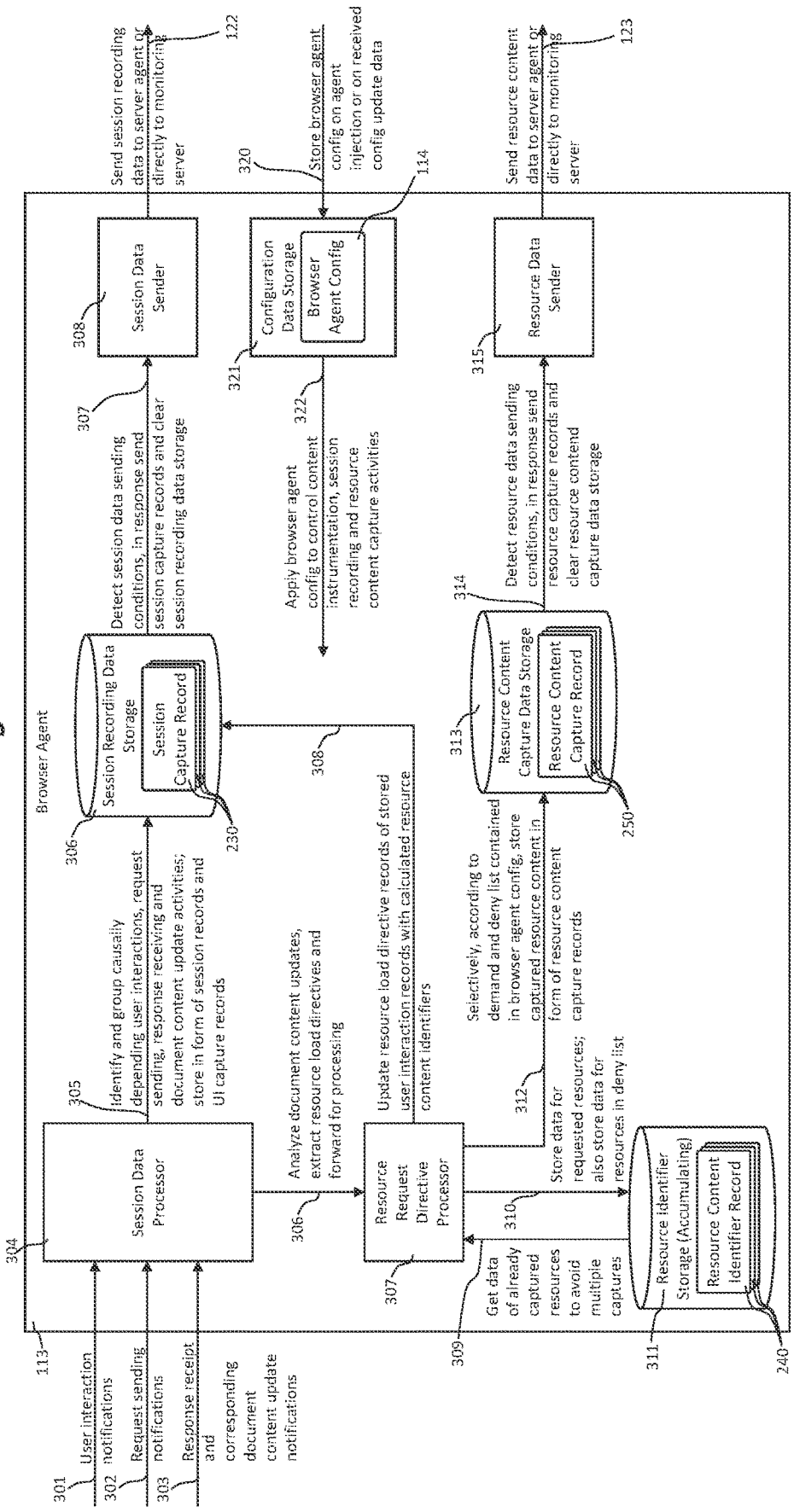
FIG. 3: Browser Agent Overview

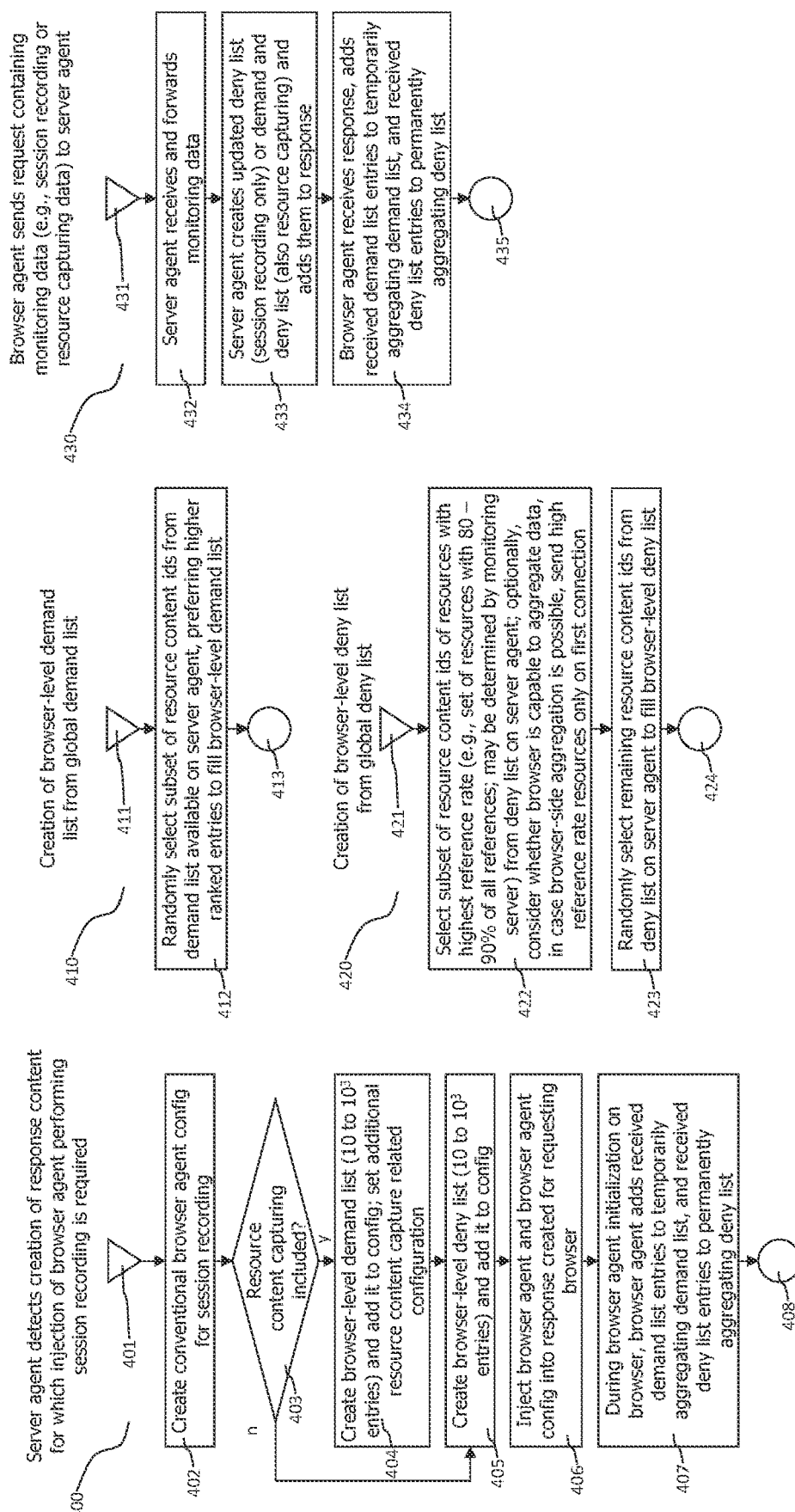

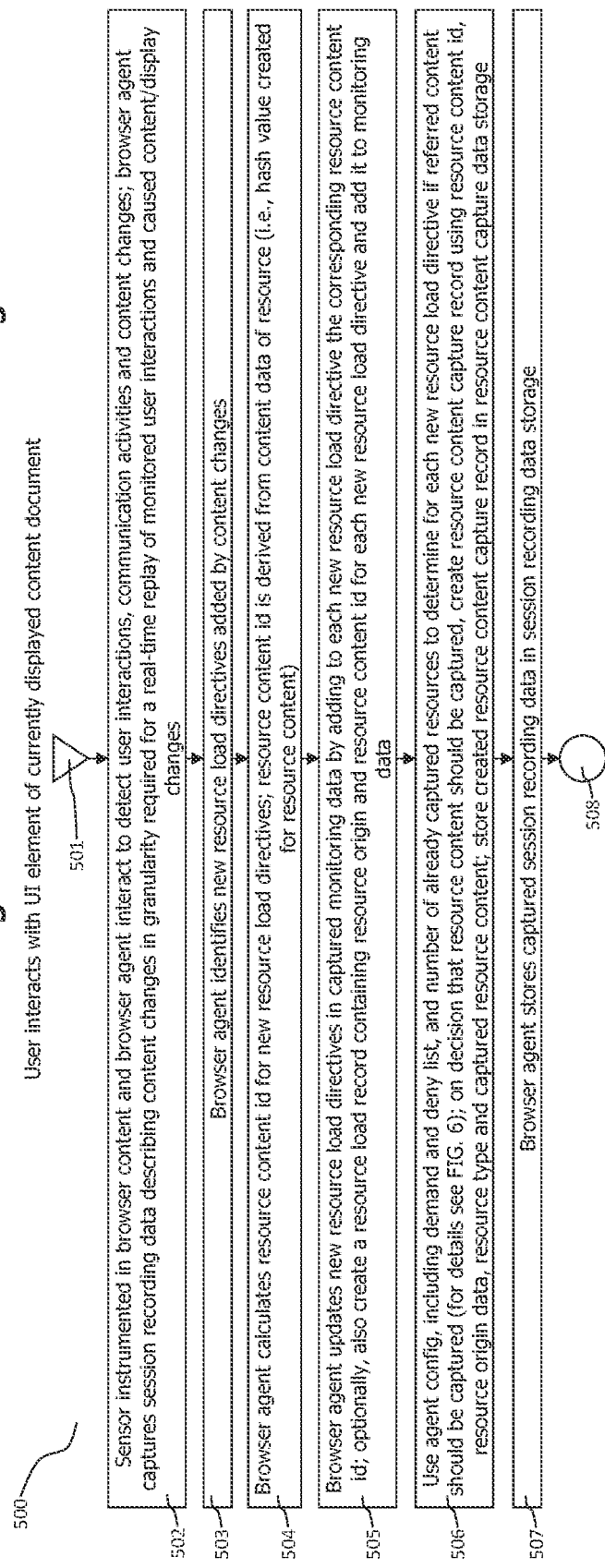
FIG. 5: Browser Agent Side User Interaction Processing

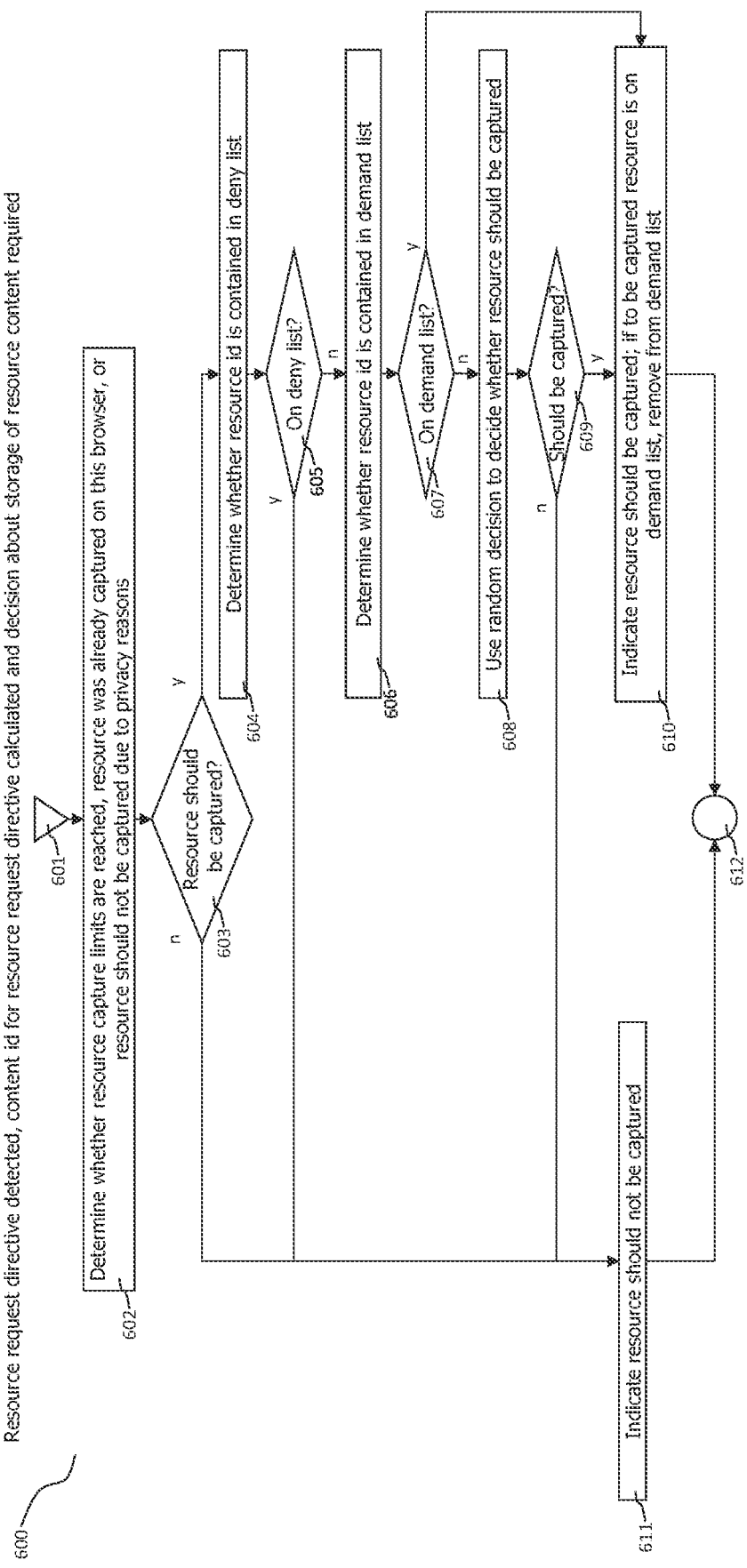
FIG. 6: Resource Capture Decision Processing

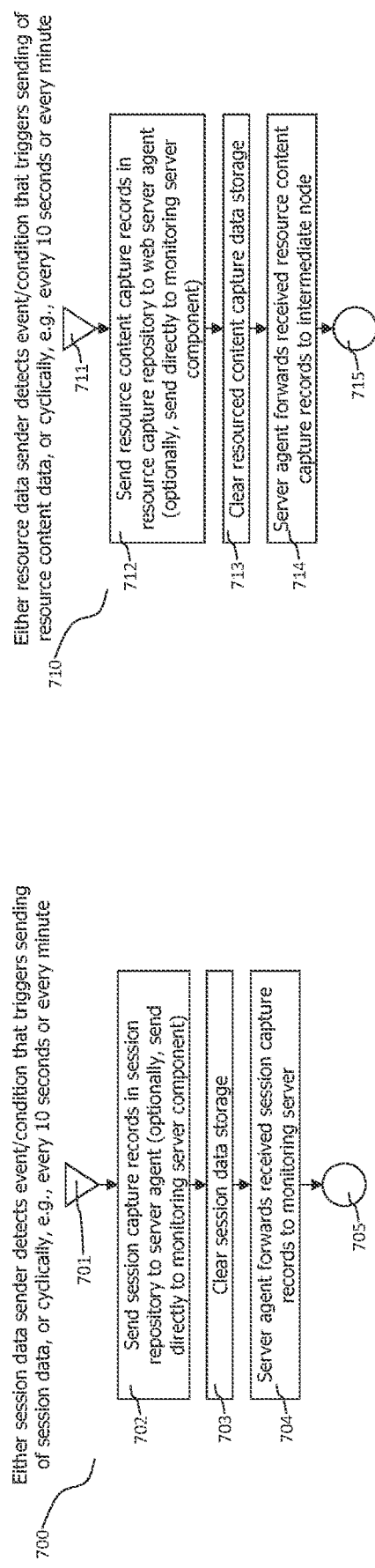
FIG. 7: Transfer of Session Recording Data and Resource Loading Data from Browser Agent to Monitoring Server

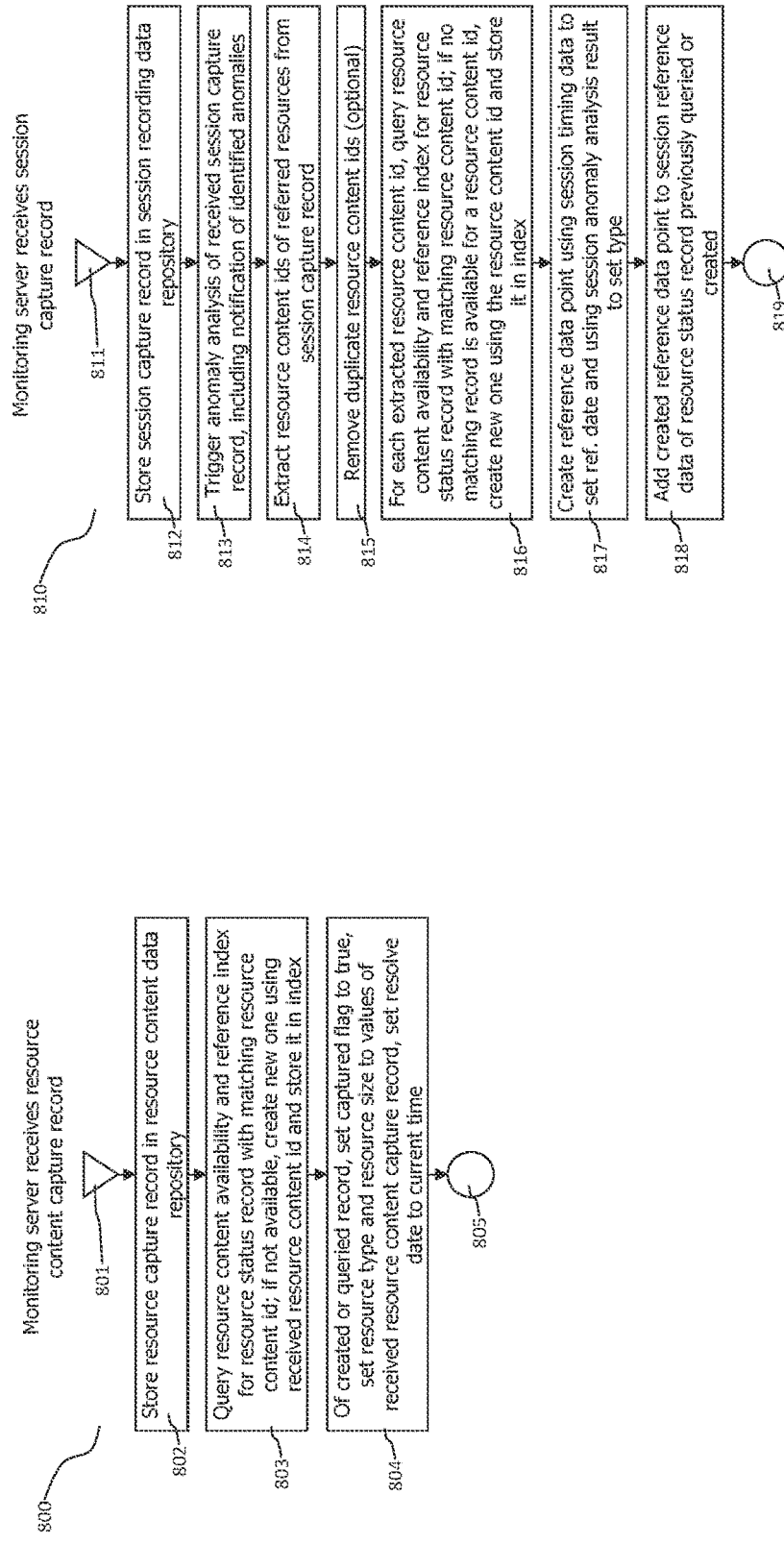
FIG. 8: Processing of Received Session Recording Data and Resource Content Data By Monitoring Server

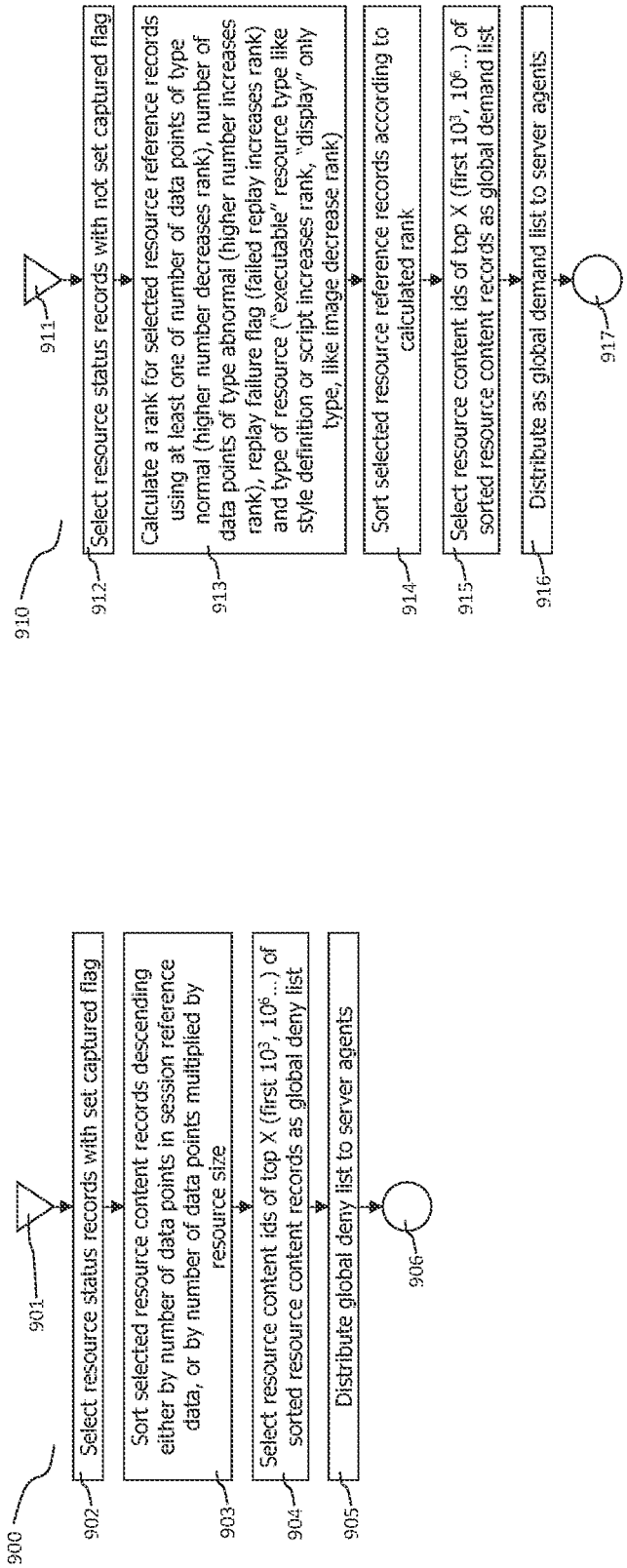
FIG. 9: Calculation and Distribution of Demand and Deny Lists

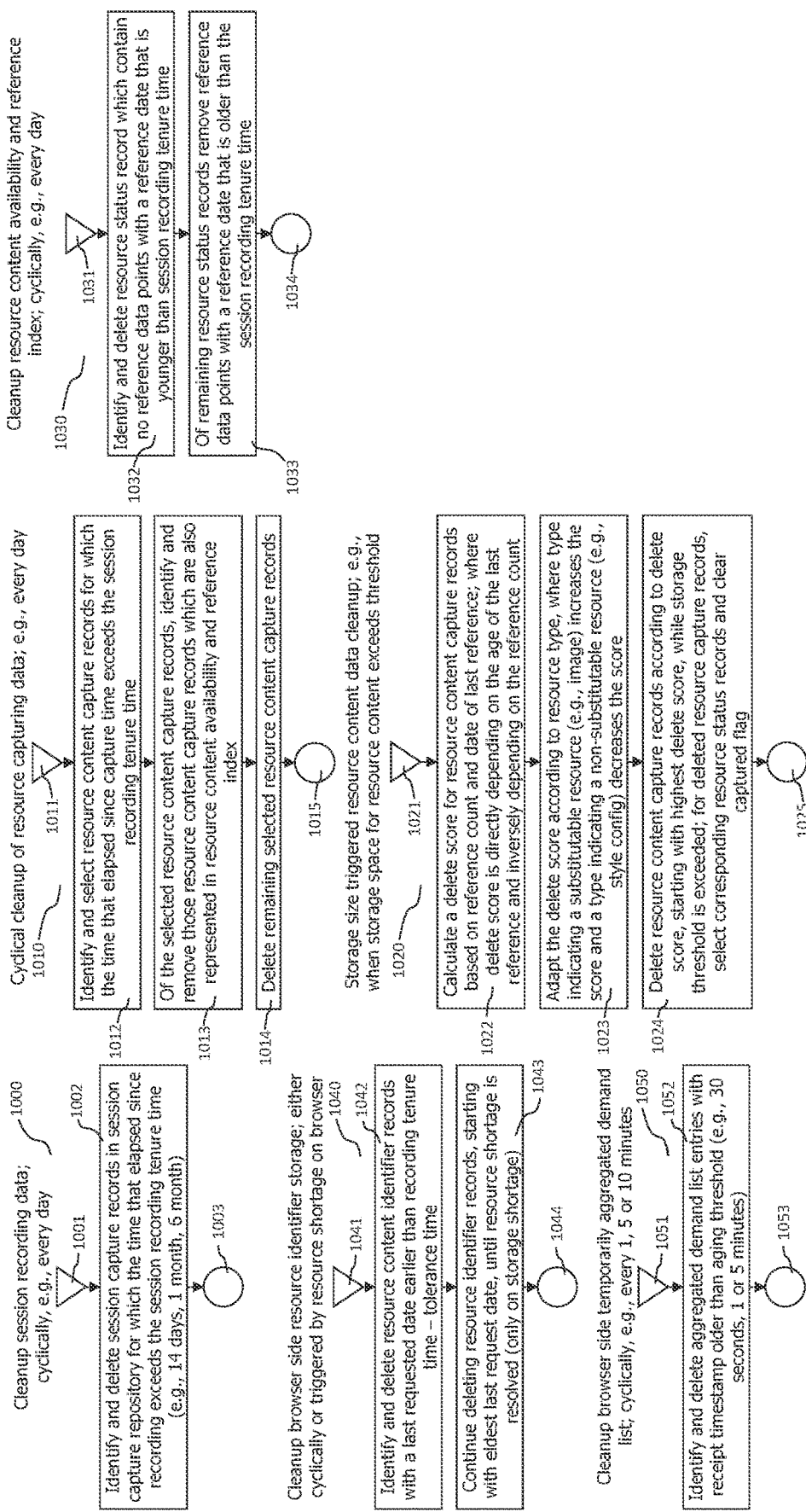
FIG. 10: Cleanup Processes

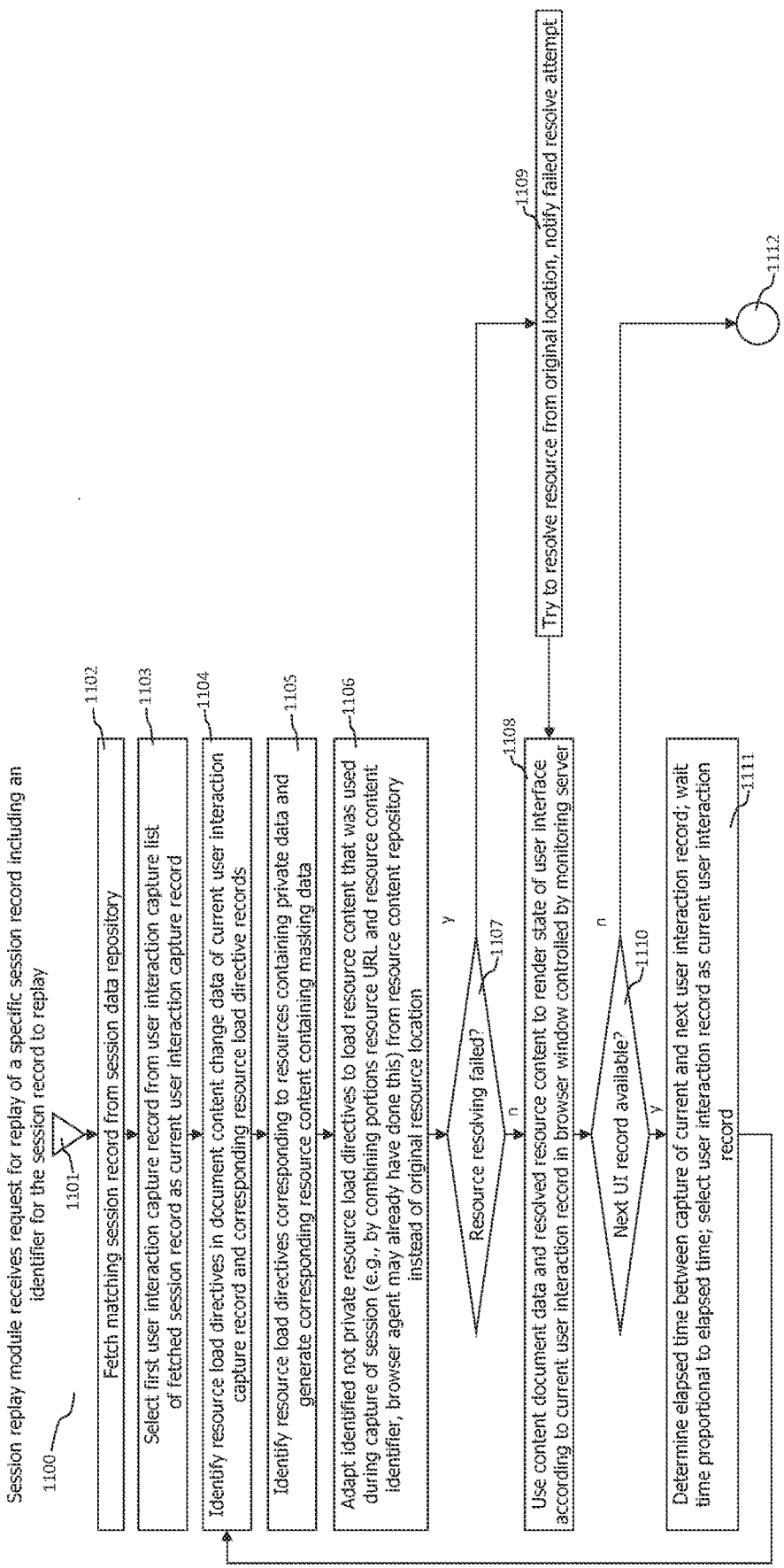
FIG. 11 Replay of Session Recording Data

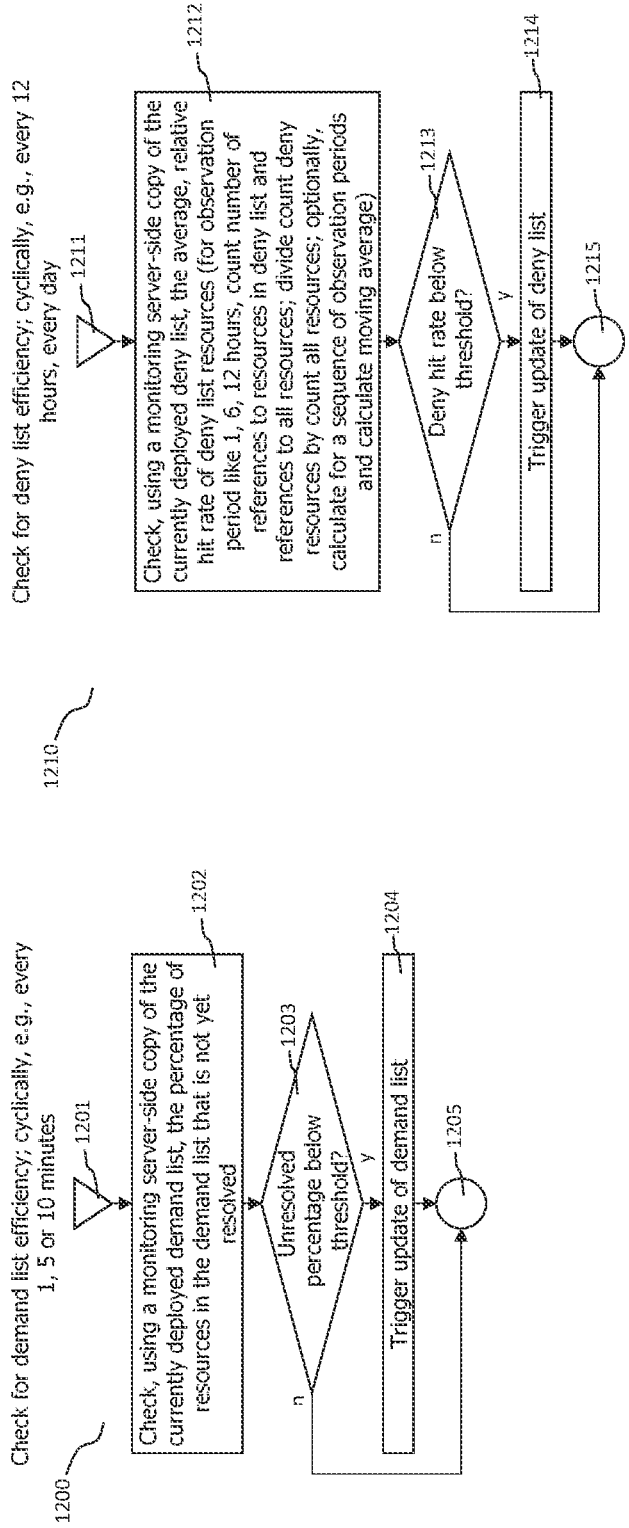
FIG. 12: Capture Efficiency Based Refresh of Demand and Deny Lists

OPTIMIZED SAMPLING OF RESOURCE CONTENT DATA FOR SESSION RECORDING UNDER COMMUNICATION CONSTRAINTS BY INDEPENDENTLY CAPTURING AGENTS

CROSS-REFERENCE TO RELATED APPLICATIONS

This application is a continuation of U.S. patent application Ser. No. 17/993,015, filed Nov. 23, 2022 (now U.S. Pat. No. 11,860,678); which claims the benefit of U.S. Provisional Application No. 63/296,283, filed Jan. 4, 2022; and U.S. Provisional Application No. 63/283,754, filed Nov. 29, 2021. The entire disclosures of each of the above applications are incorporated herein by reference.

FIELD

The invention is generally related to generating monitoring data describing user interactions with web-based applications for the visual reconstruction of user interaction sequences, and more specifically to the optimized capturing of resource content required for the visual reconstruction of user interaction sessions using dynamically adapted demand and deny lists for resources.

BACKGROUND

Providing user interaction monitoring data in a quality that also supports a movie-like reconstruction of individual user interaction sequences has become an indispensable feature for modern monitoring systems for web-based applications. The ability to reconstruct and replay user interaction sequences as they were perceived by end users of monitored applications enables the exact identification of events that were erroneous or annoying for a specific end user, together with activities and interactions that led to those events, enables much faster and focused identification and remediation of occurring errors.

However, creating this user interaction, or session recording monitoring data, poses new challenges for monitoring systems, most of all due to the enormous amount of monitoring data that needs to be created, transferred, and stored.

The recorded data consists of data describing user interaction events, like data describing the click on a link or a button, and data describing content changes or updates caused by those user interactions, like the loading of a new HTML document, or the browser-side update of currently displayed content, and data describing resources, like images files or formatting and style definition files that are used by the browser to render content documents.

For the reconstruction of user interactions, both types of monitoring data, user interaction and content change, and resource data are required. However, user interaction and content change data represent monitoring data that is unique for each recorded user session and needs to be captured always, while resource data is typically referred and used by multiple recorded session and therefore only needs to be captured and transferred once for the reconstruction of multiple user interaction sessions.

As the memory size of resource data files is considerable, it is desired to minimize the number of resource data files that are captured multiple times. Ideally, each resource that is referred by a session is only captured once, but this would need tight coordination between session recording capturing components deployed to end-user browsers, like browser agent, to exchange data about already captured resources. As browser are operated by end-users of a monitored application in an independent and uncoordinated way, this is impossible.

Therefore, there is need in the filed for a coordination approach, where individual, independently operating browser agents get information regarding a global resource capturing state from a central entity, like a monitoring server, which can be used to orchestrate and optimize the resource capturing behavior of the individual browser agents.

This section provides background information related to the present disclosure which is not necessarily prior art.

SUMMARY

This section provides a general summary of the disclosure, and is not a comprehensive disclosure of its full scope or all of its features.

The technology disclosed herein is directed to the optimized capturing of resource content data required for the replay of recorded user interaction sequences performed in web browsers. Recording user interaction sequences, or user sessions, consists of reporting monitoring data describing the actual performed interaction activities, changes to documents caused by those interaction activities, and capturing of resource content data, required to render these documents and their changes.

Monitoring data for interaction activities and for document changes is unique for individual recorded user sessions and needs to be captured completely. Resource data, like images or style definition data (e.g., CSS files) are used by multiple sessions. Therefore, it is not required to capture the content of each resource that was referred in any recorded session, as long as the content of all referred resources is captured at least once, and as long as it is possible to resolve the content of referred resources during playback.

Typically, web-based user interaction sequences take place in parallel, in independently operated web browsers, which makes a direct coordination of resource content capturing activities performed in individual web browsers impossible.

The proposed approach analyzes already recorded user session data and already captured resource content data to identify resources that are referred in captured user sessions, for which no resource content is resolved, and resources which are referred overly frequently in recorded user sessions and for which content is already available. These analyses may be performed on a monitoring server which receives all recorded user sessions, all captured resource content and which may also control session data recording and resource content capturing entities, like agents deployed to web browsers.

Identification data for resources which are referred in recorded user sessions, but for which no content has yet been captured may be sent to browser-deployed agents in form of demand lists. The demand lists may be used by browser agents to identify resources for which content capturing is preferred. For resources which are already resolved, and which are frequently referred in user sessions, a deny list may be created and sent to browser agents. The browser agents may use deny lists to identify resources for which content capturing should be avoided.

A hash code may be derived from the content data of a referred resource and used as its identification data.

Transfer and storage restrictions may prohibit a monitoring system from transferring complete demand and deny lists to monitored web browsers. Various strategies to determine appropriate subsets of those lists may be applied in such situations.

To determine a subset of a demand list for browser deployment, some embodiments may select unresolved resources with the lowest reference frequency, because those resources are used seldomly and are therefore difficult to capture. Consequently, capturing the content of such, seldomly referred resources should be prioritized. Other embodiments may select those unresolved resources that are referred by the highest number of recorded user sessions to maximize the positive impact of captured resource content on the overall ability to replay user sessions.

Yet other embodiments may perform automated anomaly detections on recorded user sessions, identify unresolved resources that are referred by user sessions that were identified as abnormal, and preferably add unresolved resources that are referred in abnormal sessions to the demand list that is sent to browser agents. Variants of those embodiments may observe session replay activities performed by users of the monitoring system, detect failed resource content resolutions during replay, and add identifies for resources for which content resolution failed during session replay to the demand list that is sent to the browser agent.

Still other embodiments may use the type of a referred resource to determine the content of the demand list that is sent to the browser agents. Those embodiments may, e.g., prefer resources that contain executable or interpretable code, like script files or style sheets, as they cannot be substituted, and missing the content of such resources may have adverse effects on the whole session replay experience. Those embodiments may deprioritize resources with a pure display-related type, like images, as absence of such types of resources typically only has a limited adverse impact on the session replay experience, and content of such types of resources may also be replaceable.

To determine a subset of a deny list that is sent to browser agents, some embodiments may select those resolved resources having the highest reference frequency in recorded sessions. Other embodiments may multiply the number of session references of resolved resources with their content size to determine an estimate for the amount of data transfer caused by those resources and then select resources causing highest amount of data transfer.

Deployment of demand and deny list is typically performed in a two-staged fashion, where the lists are first sent to server agents deployed in web servers. When web browsers connect to one of those web servers, the deployed server agent detect this connection and manipulates content requested by the web browsers to also contain a browser agent and demand and deny lists.

To add variance to the resource content captured by different browser agents, monitoring servers may send demand and deny lists to server agents that contain more entries than can be sent to a web browser with a single interaction. When a browser connects, and demand and deny lists are required for the browser, the server agent may randomly select a subset of the lists available at the server agent and send this random subset to the browser. This way, each browser agent receives a slightly different version of demand and deny lists.

A slightly different approach may be used for the random selection of deny lists. As resource reference frequencies are typically distributed unequally, where a small subset of resources, the "heavy hitters", receives the majority of references, those "heavy hitters" may always be selected, and only remaining entries of the deny list that is to be sent to a browser agent may be chosen randomly.

Some embodiments may use browser-side storage capabilities to improve the coverage of the deny lists. In those embodiments, received deny lists may be permanently stored on browser-side storage. New received deny lists entries may be added to already stored ones, to create accumulated deny lists on web browsers. When a capture decision is required for a given resource, the decision may be based on all accumulated deny list entries, instead of only the ones entries contained in a recently received deny list.

A similar browser-side accumulation mechanism may also be implemented for demand lists, where received demand list entries are stored on web browsers. As demand lists are typically much more variable than deny lists because they are constantly changed by new resolved resource content, additional mechanisms are required to quickly remove outdated demand list entries from web browsers. In some embodiments, browser agents may record a receipt timestamp for received demand list entries and delete them when a specific period since receipt has elapsed.

Demand or deny lists may be transferred or stored either in their original form, or, to save space, in form of a lossy, compressing sketch data structure that provides the functionality to determine whether a given resource identifier is contained in the list represented by the sketch with a certain probability. Example applicable sketch data structures include Bloom filters.

DRAWINGS

The drawings described herein are for illustrative purposes only of selected embodiments and not all possible implementations, and are not intended to limit the scope of the present disclosure.

FIG. 1A provides a block diagram of browser-side components of a monitoring system directed to the recording of user interaction sessions and the capturing of content of resource files used during the recorded user interaction sessions. Demand and deny lists for resource content are created from monitoring data and used to optimize resource content capturing activities.

FIG. 1B contains a block diagram of components of the monitoring system that are located on a monitoring server which receives monitoring data from instrumented browsers.

FIG. 2 shows data records which may be used to transfer and store user interaction monitoring, resource content, and agent configuration data.

FIG. 3 contains a block diagram of a browser agent that may be deployed into content displayed by a web browser that is used to interact with a monitored application.

FIG. 4 describes flow charts of processes related to the injection of a browser agent into content displayed by a web browser.

FIG. 5 conceptually describes the process performed by a browser agent to record data for user interaction sequences, to identify resource files referred during recorded user interaction data, to create resource content identifiers for the referred resource files, and, to potentially capture the content of the resource files.

FIG. 6 describes the processing performed by the browser agent to determine whether the content of a specific resource file should be captured.

FIG. 7 shows flow charts of processes for the transfer of user interaction monitoring data and resource content capture data from a browser agent to a monitoring server.

FIG. 8 provides flow charts of processes performed by a monitoring server on receipt of user interaction monitoring and resource content capture data.

FIG. 9 shows flow charts of processes to create demand and deny lists for resource content and the distribution of those lists to browser agents.

FIG. 10 provides flow charts of processes related to identification and deletion of no longer needed monitoring data in form of recorded user interaction sequences or captured resource file content.

FIG. 11 shows the process of replaying recorded user interaction sessions using captured content of referred resource files instead of original resource files.

FIG. 12 describes flow charts of processes that perform the update of demand and deny lists based on the efficiency of those lists, in terms of percentage of not yet resolved resources for demand lists, and for deny lists, in terms of a hit rate of already resolved resources by new recorded sessions.

DETAILED DESCRIPTION

Example embodiments will now be described more fully with reference to the accompanying drawings.

Modern monitoring system for web-based applications provide user interaction monitoring data that supports a movie-like replay of individual user interactions. To acquire this high-quality monitoring data, monitoring agents are injected into content displayed and processed by end-user operating web browsers. Those browser-side monitoring agents report data for displayed content documents and data describing browser-side updates of those content documents. Those agents also detect and report user interactions with those content documents.

Content documents also contain references to resource files which are required for the correct browser-side visualization of the content. Those resources are loaded and rendered by the web browser during processing of content documents. Example resources include image files, style definition (CSS) files or script files.

For an accurate replay of recorded user interaction data, also those resources are required. Conventional monitoring systems rely on availability of original resource files also during replay time and do not capture resource files. However, due to several reasons, including login-walls, or updates/removals of resource files with application version updates, the original resource files may no longer be available during replay time.

To guarantee correct user interaction replay in such situation, also resource file content needs to be captured and stored.

As typically large numbers of different user interaction sessions are recorded simultaneously on different web browsers, and the sets of resource files used by those sessions are similar, it is reasonable not to capture the content of all referred resources but try to capture the content of as much different resource files as possible and to minimize the number resources for which content is captured multiple times.

The browser in which those user interaction sessions are performed operate independently, therefore a direct exchange between browser-side agents to optimize resource capturing activities is not possible. Instead, a feedback path may be established from the monitoring server to recording browser agents to inform browser agents about a global resource content demand (i.e., resources referred in recorded sessions for which no content was yet captured) and availability (i.e., session referred resources for which content was already captured) status. The monitoring server receives user session recording data and captured resource file content from all browser agent and has therefore global knowledge of resources referred in recorded user interaction sessions and of resources for which content has already been captured.

This knowledge may be used to create data identifying resources for which content is still missing and should be captured, or data identifying resources for which content is already resolved and which should therefore not be captured again.

Coming now to FIG. 1, which provides an overview of a monitoring system capable to record user sessions and to capture content of referred resource files in a coordinated, optimized way. FIG. 1a contains portions of the monitoring system that operate in components of the application that are controlled by an application vendor, like web servers or that operate in web browser of application end-users. FIG. 1B describes components of a monitoring server that receives monitoring data in form of recorded user interaction sessions and captured resource file content and that creates and distributes data to coordinate and control the resource content capture activities of browser agents.

End users of a monitored application 100 operate a web browser 102, which loads and processes content 103 that was received from a (monitored) web server 124. The user 100 interacts 101 with UI elements 104 contained in the content 103 to use the application. Those interactions may trigger 105 content replacements, where the browser discards currently displayed content to request and display new content documents, or content updates, where the web browser performs in-place modifications of already loaded content documents. Such content manipulations may contain new resource load directives 108, like new references to image or style definition files that need to be loaded by the web browser 102 to render new or updated content documents.

A browser agent 113 is injected into content displayed by the web browser by the monitoring system which places sensors (not shown) into UI elements 104, content replacement activities 106 and resource loading directives 108, to get notified about user interaction activities 110, content replacements/updates 111 and presence of new resource loading directives 112, either due to content replacement or update.

On detection of new resource load directives, the browser agent may, in cooperation with placed sensors, analyze 109 the content of resource files referred by the new resource load directives to calculate a resource content identifier. A hash value derived from the content of the referred resource files may be used as resource content identifier. The browser agent may, in addition to calculating the resource content identifiers, also selectively capture the actual content of some resource files.

Resource content directives contained in monitoring data created by sensors and the browser agent may be enriched with corresponding resource content identifiers. The same resource content identifiers may also be used as identifiers for captured resource file content. Adding resource content identifiers to resource loading directives in captured content document data and to captured content of resource files enables the monitoring system to identify and resolve the content of resource files that were used during the execution of the monitored user interaction session at a later time when those resource files may no longer be available at their original location.

The injected browser agent 113 contains configuration data 114, which defines and controls the activities performed by the browser agent. Those activities contain but are not limited to the placement of sensors in the content 103, placement of correlation data to requests sent by the browser, detecting the receipt of responses by the browser agent and monitoring processing caused by the received responses, where those requests and responses are related to the execution of the monitored application, sending of requests to transfer monitoring data or receiving responses containing agent configuration updates. In addition, the browser agent configuration 114 may contain demand and deny lists containing resource content identifiers of resource files for which content is still missing and should therefore be captured with priority and resource content identifiers for which corresponding content is already captured and for which subsequent content capturing should be avoided.

Web browser 102 and browser agent 113 communicate with a monitored web server. The web browser may send 120 requests to receive data for in-place modifications of already loaded content, to receive new content to replace already displayed content or to receive resource files to the monitored web server 124 and may receive responses 121 containing the requested data. Requests and responses exchanged between browser 102 and monitored web server 124 related to the execution of a monitored application may be recognized, monitored, and reported by a browser agent 113 injected into content displayed by the web browser and by a server agent 128 injected into the monitored web server and configured to place sensors 126 into request processing functionality 125 of the monitored web server, which receives 120 requests and returns 121 corresponding responses.

The sensor 126 instrumented into request processing functionality of the web browser may recognize and report 127 incoming requests and sent responses to the server agent 128. The server agent may identify requests that contain content documents that are sent to the browser 102 for interpretation and processing and may adapt the content contained in those responses in a way that it contains in addition to the content defined by the monitored application, also a browser agent 113.

The browser agent 113 may send 122 and 123 requests containing monitoring data, either in form of session recording data describing user or in form of captured resource file content. The monitoring data requests 122 and 123 are received by a server agent 128 operating in the monitored web server 124 that provided the content currently displayed by the web browser 102. The server agent may answer those requests with responses (not shown) which may contain updates for the configuration 114 of the browser agent, e.g., in form of updates to demand or deny lists.

The server agent 128 communicates with a monitoring server 140 by sending 129 and 130 monitoring data in form of session recording data and captured resource file content to the monitoring server and receiving 131 configuration data for server agent 128 and browser agent 113 from the monitoring server 140. A monitored server 124 may be connected to and interact with a multitude of browsers 102 at the same time. Also, server agents 128 may communicate with a multitude of browser agents operating in those browsers at the same time.

A monitoring server 140 (FIG. 1b) receives session recording data 129 and resource capturing data 130 from various server agents 129 and distributes 131 configuration data for those server agents, where the configuration data sent to server agents 129 also contains configuration data for browser agents 113 managed by those server agents.

Received session recording data 129 is stored in a session recording data repository 144 and received resource capturing data 130 is stored in a resource content data repository 150.

On receipt of session recording data, an anomaly detection process 143 performed by an anomaly analyzer may be triggered, to identify and report 141 received user sessions that contain unexpected or undesired events. Examples of such events include but are not limited to errors or performance degradations that occurred during the user interaction that adversely impacted the experience of the user, or observed interaction patterns, like "rage clicks" (e.g., user clicked at the same UI element multiple times, with high frequency) indicating a bad user experience. The anomaly analysis may either be performed solely by the anomaly analyzer 142, or it may be performed jointly in cooperation with an analysis unit (not shown) operated by the browser agent. The browser agent-side analysis unit may perform a pre-analysis of acquired session recording data, possibly already during ongoing recording of the sessions. The anomaly analyzer operating on the monitoring server may use the pre-analysis results of the browser agents for a final anomaly analysis.

A session replay module 147 may receive requests to replay specific sessions, and in response of such requests, select 145 corresponding session recording data from the session recording data repository 145 and perform a movie-like reconstruction of the user-interface behavior as perceived by the end user of the application. Session recording data may also contain references to resource files in form of resource loading directives 108. Those resource loading directives may also contain the resource content identifier calculated by the browser agent. During replay, the session replay module may use the resource content identifiers of resource loading directives to resolve 148 the content of the referred resources from the resource content data repository 150. If resolving of resource content fails (first from resource content data repository and then also from the original resource location), the failed resource content lookup 146 may be reported by the session replay module.

A resource content availability and reference index (RCARI) 160 may be updated on receipt of session recording data 149 and on receipt of resource content capturing data 151. The RCARI may contain multiple resource status records 161, each resource status record representing a specific resource that was referred in at least one recorded user session and its status. A resource status record 161 may contain but is not limited to a resource content identifier 162, which was derived from the content of a specific resource, e.g., in form of a hash code calculated from the resource content, resource type data 163, which specifies the type of the describe resource, example types include image, sound, script or style definition file, resolution data 164, specifying the date when the content for the resource was resolved, resource size data 165, specifying the storage size of the content of the described resource, a replay failed flag 166, indicating whether the resolution of the resource content failed during a session replay, session reference data 167, containing statistical data for references of the described resource in recorded user sessions in form of reference data points 168, and a captured flag 171, specifying whether content data for the described resource has already been captured.

Reference data points 168 may contain but are not limited to reference date data, specifying the time when the resource was referred, and (session) type data 170, specifying whether the user session in which the resource reference occurred was identified as abnormal user session.

Dates, like resolve date 164 and reference date 169 may be stored in an approximated form, as an accuracy on a day level suffices for those dates. Resource size data may also be stored in an approximated way, as only a size category or range, like "10-100 Kbyte", "100 Kbyte-1 Mbyte", "1 Mbyte-10 Mbyte" are required for subsequent calculations of demand and deny lists.

On receipt of session recording data, resource content identifiers of resources referred in the user sessions may be extracted, and for each extracted resource content identifier, a matching resource status record 161 may be queried from the RCARI. If a matching resource status record exists, a new reference data point 169 using reference date and session type (as determined by the anomaly analyzer 142) may be created and added to the resource status record. If no matching resource status record 161 exists, a new one may be created using the resource content identifier and all other data for the referred resource that is available in the data of the recorded session, and a reference data point 169 may be created and added to the new resource status record. The captured flag of the new resource status record may be set to indicate absence of content of the described resource.

On receipt of resource content capture data, a resource status record with a resource content identifier matching the resource content identifier of the captured resource content may be queried from the RCARI. In case a matching one is found, its captured flag 161 may be set to indicate presence of the resource content, and other status data, like resource size 165 and resolve date 164 and resource type 163 may be set with data from the captured resource content. If no matching resource status record is found, a new one may be created using resource content identifier and other descriptive data available in the received resource content capture data. The captured flag 171 of the created resource status record may be set to indicate presence of content for the described resource.

The replay failed flag 166 of a resource status record may be set when the session replay module 147 notifies that content resolution for a resource with a matching resource content identifier failed.

A demand/deny list generator 181 may cyclically analyze the resource status records 161 stored in the RCARI to create updated global deny 185 and demand 186 lists.

Global demand lists 185 may contain a sequence of resource content identifier 187 of resources for which content was not yet resolved and global deny lists 186 may contain a sequence of resource content identifiers 187 for which content was already resolved.

The created global demand and deny lists may be forward to a browser/server agent configuration generator 190, which uses those lists for the creation of configuration data for server agents that are connected to the monitoring server, which also contains configuration data for browser agents injected into content created by web servers into which the server agents are injected. Created configuration data is then sent 131 to connected server agents.

Data transfer from monitoring servers to connected server agents, or from server agents to browser agents may be limited, therefore it may not be possible to transfer full global demand lists 186 or global deny lists 185 from monitoring servers to browser agents. Various strategies may be applied to select those list entries those lists that should be transferred.

For deny lists, resolved resources with a high number of references in recorded sessions may be preferred to be transferred, as it can be assumed that references to those resources may also occur frequently in future recorded sessions. Excluding those resources from content capturing could reduce the number of duplicated resource content capture to a great extent.

Variant strategies may, for each resolved resource calculate the product of resource content size and number of session references of the resource, to determine an estimate for the data transfer rate corresponding to each resource. Resolved resources with a high estimated data transfer rate may be preferred to be included in deny lists that are transferred to browser agents.

For demand list entries, unresolved resources with low session reference frequencies may be preferred, as it is difficult to capture content of seldomly referred resources and therefore those resources should be preferred. In addition, unresolved resources that are referred in recorded sessions that were identified as abnormal may be preferred, as the probability that recordings of such sessions will be replayed is higher than for unsuspicious recordings. Also unresolved resources for which a failed content resolution during session replay occurred (replay failed flag 166 set) may be preferred, as the content of those resources was already required for the replay of a recorded session and subsequent replay of the session may be performed soon.

Resource type data 163 may also be used to select demand list entries to be transferred to browser agents. Resource types containing code or configuration data, like script or style definition files may be preferred over types only containing media data like image or sound files. Rationale of this type-based prioritization is that missing code or configuration data may have a global adverse effect on the session replay experience which makes the whole replay worthless, whereas missing images/sound files only have limited and local adverse effects, and missing media data can be more easily substituted.

Another strategy may determine for unresolved resources the number of different recorded sessions referring these resources and prioritize unresolved resources according to the number of different sessions referring them. Priorities may assigned to unresolved resources proportional to the number of recorded sessions referring them. The idea behind this strategy is that the benefit of resolving the content of resources increases with the number of recorded sessions referring it. If a resource is referred by multiple recorded session, resolving it has a positive impact on all those sessions, as the probability that all resources are resolved raises for all referring sessions.

Coming now to FIG. 2, which shows data structures that may be used to store and transfer browser agent configuration data, session recording data and captured resource content.

A browser agent configuration record 114 may be used to store and transfer configuration data for browser agents 113. Such configuration records may be created on a monitoring server and then transferred to browser agents via server agents, either as component of an enclosing server agent configuration record (not shown), or on their own.

A browser agent config may contain but is not limited to general instrumentation and monitoring configuration data 201, which may be used to control general instrumentation and monitoring activities of receiving browser agents and which may contain a session recording flag 202, which specifies whether the receiving browser agent should also perform session recording, and a resource capture configuration section 203, which may be used to define the resource monitoring and resource content capture activities of the receiving browser agent.

Recording browser side user interaction activity to enable later movie-like replay of those user interactions generates vast amounts of monitoring data and is therefore considerably costly in terms of monitoring data generation, transfer, and storage. Therefore, it may not be possible to perform session recording in all browser agents. The session recording flag 202 may be used to randomly select a subset of browser agents that perform session recording in addition to conventional monitoring activities.

Resource capture configurations 203 may contain but are not limited to resource load directive detection rules 204, which specify how resource references are identified in document content displayed by a web browser, resource content identifier calculation instructions 205, which specify how a value for an identifier is extracted from resource content, a resource content capture flag 206, which specifies whether the receiving browser agent should capture content of referred resources, resource content capture limits 207, to limit the number of referred resources for which a browser agent captures content, and resource content capture decision support data 208, which may be used to determine for a given resource if its content should be captured.

Resource content capture decision support data may contain a demand list 209 and a deny list 210, each of those lists containing a sequence of resource content identifiers 187. Demand and deny lists may either be transferred and stored in their original form, or in form sketching data structure, which do not contain the original resource content identifiers, but compressed data derived from those identifiers. The sketching data structures may be used, for a given resource content identifier, to determine with a specific level of certainty whether the given resource content identifier is contained in the original list of resource content identifiers. Bloom filters are examples for such sketching data structures.

A user interaction capture record 220 may be used to store portions of a recorded user session that are related to an individual interaction of a user with the monitored application.

A user interaction capture record 220 may contain but is not limited to a UI element identifier 221, identifying the user interaction element that was used for the recorded user interaction, interaction detail data 222, like for interaction with a text element, the entered text, a caused document change section 223, which contains data describing the change of the currently displayed content document caused by the user interaction, interaction timing data 224, describing timing for different phases of the user interaction, like start/end of actual user interaction, start/end of caused network activities like sending of requests and receiving of responses or start/end of browser side update and rendering of changed content documents, and optional resource loading data 225, describing new resource load directives that were created by the update/change of the content document.

Caused document changes 223 may contain captured (HTML) documents or document fragments that describe the changes to the content document that were caused by the recorded user interaction. If those documents or document fragments contain resource loading directives, like elements to load and render resource files, the browser agent may calculate a resource content identifier for the content of the referred resources and adapt the resource loading directives contained in the captured documents by adding the corresponding resource content identifier to resource loading directives.

Resource loading data 225 may contain a resource load directive record 226 for each resource load directive contained in caused document change data 223. A resource load directive record 226 may contain but is not limited to a resource content identifier 227 derived from the content of the referred resource, resource origin data 228, describing the location (e.g., the URL) from which the resource was loaded, and resource metadata 229, describing the resource itself, e.g., by its type or memory size.

Resource loading data and resource content identifiers added to resource load directives of captured document change data 223 may be used to identify and resolve resource content during replay of a recorded session. Some embodiments may only add resource content identifiers to captured content document change data 223 and some embodiments may only create resource loading data 225.

A session capture record 230 may be used to transfer and store captured user interaction sequences. It may contain but is not limited to browser identification data 231 uniquely identifying the web browser 102 on which the user interaction sequence was reported, session identification data 232, uniquely identifying the recorded session, browser environment description data 233, describing the browser and the environment of the browser on which the session was recorded, e.g., in form of browser type and version and type and version of the operating system on which the browser is executed, session timing data 234, containing start and end time of the recorded session, and a user interaction capture list 235, containing a sequence of user interaction capture records 220 of the recorded session.

Resource content identifier records 240 may be used by browser agents 113 to keep records about already observed resources and about resources for which content was already captured by the browser agent. A resource content identifier record 240 may contain but is not limited to a resource content identifier 241, derived from the content of an observed resource, a last requested date 242, containing the date when the resource was last requested on the browser in which the browser agent operates, and a captured flag 243, indicating whether the content of the resource was already captured and sent to the monitoring server.

A resource content capture record 250 may be used to transfer captured resource content from a browser agent to a monitoring server and may contain but is not limited to a resource content identifier 251, resource origin data 252, resource metadata 253 including, e.g., information about the type of the resource, and a captured resource content data section 254, containing the actual captured resource content data.

Coming now to FIG. 3, which provides a block diagram of the components of a browser agent 113.

A browser agent 113 contains a session data processing unit 304, which receives user interaction notifications 301, request sending notifications 302 and response receipt and corresponding document content update notifications 303, either from sensors placed in the content document by the browser agent, or from the environment of the web browser 102 in which the browser agent operating. The session data processing unit 304 creates user interaction capture records 220 from received notifications and stores 305 appends 306 them to the user interaction capture list 235 of a session capture record 230 stored in a session recording data storage 306. There may multiple session capture records stored in the session recording data storage, representing one or more previously recorded sessions and one currently recorded session. The session data processor may append created user interaction capture records to the session capture record representing the currently recorded session.

A session data sender 308 may detect session data sending conditions, like an indication that the current content document including the browser agent is going to be unloaded, the memory size of session recording data stored in the session recording data storage exceeds a certain threshold, or a specific time since last sending of session recording data is elapsed. On detection of such conditions, the session data sender 308 may send 112 the session capture records 230 contained in the session recording data storage to a monitoring server, either directly or via a server agent.

In addition to creating session recording data, the session data processor may also analyze detected document content updates to identify resource load directives and send 306 those resource load directives to a resource request directive processor 307. As an example, the session data processor may detect that a content update adds a new paragraph to the content document that contains a reference to an image resource. The session data processor may extract this image reference and send it to the resource request processor.

The resource request processor 307 may, on receipt of a resource request directive, read the content of the resource referred in the received resource request directive to calculate a resource content identifier for the resource. The calculated resource content identifier may be used to update 308 resource request directives contained in captured content stored in session capture records and to create corresponding resource load directives 226 and store them in the resource loading data list 225 of a user interaction capture record 220.

The resource request directive processor may also query a resource identifier storage 311 containing resource content identifier records for all resources previously observed by the resource request directive processor for a resource content identifier record 240 with a resource content identifier 241 matching the resource content identifier that was calculated for the resource referred by the received resource load directive. If no matching resource content identifier record is found, a new one may be created using the calculated resource content identifier. The last requested date 242 of the created resource content identifier record may be set to the current date. If a matching resource content identifier 240 is found, its last requested date 242 of the found record is set to the current date.

The resource request directive processor may also decide whether the content referred by the received resource load directive should be captured. The demand 209 and deny 209 lists contained in the browser agent configuration 114 may be used for this decision. If the resource request directive processor decides to capture the content of the resource, the captured flag 243 of the resource content identifier record representing the captured resource (the resource content identifier record with a resource content identifier 241 matching the resource content identifier calculated from the currently captured resource content) is set. Setting the captured flag 243 for already captured resource content may be used to avoid capturing the same resource content multiple times on the same browser.

Some embodiments may also create resource content identifier records 240 for each resource content identifier contained in the deny list. The last requested date 242 of those records may be set to the date when the deny list was received and the captured flag may be set to avoid future capture of resource content with matching resource content identifiers.

Captured resource content may be stored 332 in a resource content capture data storage 313 in form of resource content capture records 250.

A resource data sender 315 may monitor the browser environment to detect conditions (indication to unload current content, storage size of stored resource content exceeds threshold, or time since last sending of resource content elapsed) for the sending of captured resource content. On occurrence of such conditions, the browser data sender may fetch 314 resource content data records 250 stored in the resource content capture data storage 313 and send 123 them to a monitoring server, either directly or via a server agent.

A configuration data storage 321 may store browser agent configuration data 114. Browser agent configuration data may either be set when the browser agent is injected into content displayed by the browser, or it may be updated and set on later communication of the browser agent with a server agent. Portions of the browser agent configuration may be stored in a transient way and replaced with every injection of a browser agent, as it represents no browser specific state information. Other portions of the config, like demand and deny lists may be stored in a persistent way, which enables the monitoring system to accumulate deny and demand list data on a browser over a longer period. Cleanup of no longer required, persistently stored configuration data has to be managed by the browser agent. For detailed descriptions of those cleanup processes, please refer to processes 1040 and 1050 shown in FIG. 10.

On receipt of new or updated browser agent configuration data 114, the configuration data storage 321 also applies 322 the new configuration on the corresponding components of the browser agent. As an example, for resource content identifiers contained in received deny lists, corresponding resource content identifier records 240 may be created and stored in the resource identification storage 311. The resource identification storage may also be stored in a permanent way that survives the unload of document content and is then available to another browser agent injected into new loaded content.

Processes performed during the injection of a browser agent into document content, which is to be sent to a web browser for display, by a server agent and during the sending of monitoring data from a browser agent to a server agent are described in FIG. 4.

Process 400 describes the injection of a browser agent into document content by a server agent. Sensors 126 placed in request processing functionality of a monitored web server report the creation of requested document content to the server agent, which adapts the created content before it is sent to a requesting browser by injecting a browser agent into the document content. Process 400 describes the injection of a browser agent that is selected to perform session recording. Only a subset of all browser agents may be selected to perform session recording.

The process starts with step 401 when creation of document content is detected. Following step 402 creates a browser agent configuration record configured for a browser agent configured for session recording. The session recording flag 202 of this configuration data may be set, and configuration data corresponding to the capturing of resource content (resource content capture flag, resource content capture limits or resource content capture decision support data) may not yet be set in step 402.

Following decision step 403 decides whether the injected browser agent should also perform resource content capturing. A subset of browser agents that were selected to perform session recording may also be selected to perform resource content capturing. Both selection of browser agents that perform session recording, and selection of browser agents that in addition perform resource content capturing may be performed randomly. Step 404 is executed if also resource capturing should be performed, which creates a browser-level demand list as described in process 410 and stores it in the demand list section 209 of the created browser agent config. Step 404 may also set additional configuration data related to resource content capturing, like resource content capture limits or the resource content capture flag. Step 404 is skipped if the injected browser agent should not capture resource content.

Following step 405 is executed after step 404 or after decision step 403 if resource content capturing is not desired for the currently injected browser agent. Step 405 creates a browser-level deny list, as described in process 420 and stores it in the deny list section 210 of the created browser agent config.

Adding deny list data also to configuration of browser agents that do not capture resource content data enlarges the set of browser agents that accumulate deny list data. Due to cost reasons, only a small fraction of browser agents performs session recording, and only a small fraction of browser agents performing session recording also perform resource content capturing. By sending deny list data also to browser agents only performing session recording, the set of browsers on which deny list data is accumulated and stored is enlarged. This increases the probability for a browser agent that performs resource content capturing that an already pre-initialized deny list is available on the web browser in which it is operating.

For demand list data, browser side long-term aggregation is not that useful because the content of demand lists is much more variable than deny list content as, demanded resource content is continuously resolved by resource capturing browser agents. Therefore, a more short-lived aggregation, which is only applied on browser agents that preform resource content capturing is desired for demand lists.

Step 406 then injects the browser agent and the created browser agent config into the created document content, which is then sent to the browser.

Step 407, which is executed on the browser receiving the content, initializes the browser agent 113 in the content that is displayed by the web browser, which may include storing resource content identifiers 187 contained in the received deny list 210 in a permanently aggregating deny list (e.g., in form of resource content identifier records 240 stored in the resource identifier storage 311) and resource content identifiers 187 contained in the received demand list in a temporarily aggregating storage. The aggregating demand and deny lists may operate in a way that new received resource content identifiers are added to those lists, which grow with every received resource content identifier that is not yet in the respective list. The only difference between both aggregating lists lies in their cleanup strategy. For deny lists, a long-term cleanup strategy may be applied, which removes entries after some days or even weeks. For demand lists, a short-term strategy may be applied, which removes entries after 5, 10 or 30 minutes. The process then ends with step 408.

Creation of a browser-level demand list, as performed by step 404 of process 400 is described in process 410. The process is executed by a server agent 128 and starts with step 411, when creation of a browser-level demand list is requested. Following step 412 may then randomly select entries for the browser-level demand list from a demand list that is available on the server agent. The demand list on the server agent may be identical with the global demand list 186 created on the monitoring serve, or it may be subset of the global demand list, depending on communication restrictions between monitoring server and server agent and storage restrictions on the server agent. Regardless of applicable restrictions, the size of the demand list available on the server agent is typically larger than the size of the demand list that can be sent to the browser agent. To achieve variance between the demand lists of different browser agents, it is desired to apply random selections for the resource content entries of the server agent side demand list that are added to the browser-level demand list. Step 412 may iterate over entries of the server agent side demand list and randomly determine if an entry is added to the browser-side demand list until the browse-side demand list is filled.

The server agent demand list may be sorted according to a priority of identified required resources. This sorting may also be used by the creation of the browser-level demand list, by setting the probability that a given resource is selected for the browser-level demand list proportional to the priority rank of the resource. This way, resources with a higher priority also have a higher probability of being selected for a browser-level demand list.

The process then ends with step 413.

The creation of browser-level deny lists, as performed by step 405 of process 400 is described in process 420.

The process starts with step 421, when the creation of a browser-level deny list is requested. Following step 422 then selects the subset of resource content identifiers of resources that receive the highest percentage of references in recorded sessions. Step 422 exploits the observation that a rather small set of resources receives the majority of references in recorded sessions, as some resources, like header images or basic style definitions, are referred in every page of an application. It is desired to resolve the content of those resources quickly and then try to avoid any superfluous capture of content of those resources. Therefore, resource content identifiers of those "heavy hitter" resources should be contained in any browser-level deny list.

Following step 423 randomly selects resource content identifiers from the remainder of the deny list entries that are available on the server agent until the browser-level demand list is filled. The process then ends with step 424.

Combined sending of monitoring data, in form of session recording data or resource content capture data and receiving of deny end demand list entries by browser agents is described in process 430.

The process starts with step 431, when a browser agent sends a request containing monitoring data to a server agent. In step 432, the server agent receives the monitoring data request and forwards the monitoring data to a monitoring server. In following step 433, the server agent creates a response for the received monitoring data request. If the communicating browser agent performs session recording, but no resource content capturing, an update for the deny list is created and added to the response. If the browser agent also performs resource content capturing, also an update for the demand list is added to the response. An indicator determining whether the browser agent performs only session recording, or session recording and also resource capturing, may be added to the monitoring data request sent in step 431 and then used in step 433 to determine which functionalities the browser agent performs. The response is then sent to the browser agent.

In step 434, the browser agent receives the response for its monitoring data send request and adds received demand list updates to its temporarily aggregating demand list and received deny list updates to its permanently aggregating deny list. The process then ends with step 435.

Coming now to FIG. 5, which conceptually describes the process of creating session recording data and resource content capture data by a browser agent. The process starts with step 501, when a user interacts with a UI element of the content currently displayed by the web browser. In followings step 502, a sensor instrumented into the content document that is currently displayed by the browser agent detects the performed interaction and reports it to the browser agent. Communication activities and replacements/updates of content caused by the user interaction are also detected by sensors and reported to the browser agent. The browser agent captures data describing the observed activities and content changes and creates corresponding session recording data in form of user interaction capture records. In following step 503, the browser agent analyses captured content change or update data to identify new resource load directives that were added with the change or update of the content document and in subsequent step 504 it calculates resource content identifiers for the resources referred by the resource load directives identified by step 503. Step 504 may read the content data of those resources, calculate corresponding hash values from the read content data and use the hash values as resource content identifiers.

In step 505 the browser agent may then update the resource load directives in captured content change data to contain the calculated resource content identifiers. Step 505 may either add a tag containing the resource content identifier to the resource load directives, or it may add the resource content identifier to the resource content location data of the resource referred by the resource load directives. As an example, resource load directive may refer to a resource stored at location "app/images/myImage.gif". The resource content identifier calculated for "myImage.gif" may be 1234. Step 505 may adapt the storage location of the resource load directive to "app/images/myImage.gif_1234". For resolving of the resource content during replay, the replay mechanism may ignore resource location data before the underscore and search the resource content data repository 150 for a resource content with resource content identifier 1234.

Optionally, step 505 may also create resource load directive records 226 for each identified resource load directive, using corresponding resource content identifier and resource origin data.

Following step 506 determines for each identified resource load directive whether the content of the referred resource should be captured. Note that step 506 is only executed if the browser agent is configured to capture resource content, i.e., when the resource content capture flag 206 is set.

Step 506 may consider resource content capture limits, number of already captured resources, data from demand and deny list and data for resource content that was already captured on this browser for the decision on capturing the content of resources. A detailed description of this decision process can be found in FIG. 6. If step 506 decides to capture the content of a resource, a resource content capture record 250 is created using resource content identifier, resource origin, resource metadata, like resource type and actual resource content. The created resource content capture record is stored in the resource content capture storage 313 for later transmission to the monitoring server 140. In this case, also the resource identifier storage 311 may be updated to record the capturing of the resource on the browser.

In step 507 the browser agent stores created session recording data in the session recording data storage 306 for later transmission to the monitoring server. The process then ends with step 508.

Referring now to FIG. 6, which describes the process performed to decide whether content for a specific resource should be captured. The process starts with step 601, when a resource request directive is received for which a decision is required whether the content of the referred resource should be captured. Following step 602 determines if resource capture limits are already reached for the ongoing session recording, if the resource contains user-private data and should therefore not be captured or if the resource was already captured by this web browser (e.g., by checking the resource identifier storage 311). If one of the conditions checked by step 602 applies, following decision step 603 continues the process with step 611, which indicates that the resource content should not be captured, and the process ends with step 612.

Otherwise, step 604 is executed, which checks whether the resource content identifier for the resource referred in the received resource load directive is contained in the deny list of the browser agent. Subsequent decision step continues with step 611, which indicates that the resource content should not be captured if the resource content identifier is present in the deny list. The process then terminates after step 611 with step 612.

Otherwise, step 606 is executed, which determines whether the resource content identifier is contained in the demand list, and subsequent decision step 607 continues with step 610, which notifies that the resource should be captured if the resource content identifier is contained in the demand list. Step 610 may also remove the resource content identifier from the demand list.

If otherwise the resource content identifier is not on the demand list, step 608 is executed which randomly decides whether the resource should be captured. Following decisions step 609 then continues the process either with step 611 to notify that the resource should not be captured or with step 610 to notify that the resource should be captured depending on the outcome of step 608. Some embodiments may, instead of unconditionally capturing the content of resource listed in the demand list, adapt the random decision process of step 608 to prioritize the selection of resources on the demand list for capturing. As an example, resources that are not on the demand list may be selected for capturing with a probability of 50%. For resources that are listed on the demand list, this probability may be increased to a higher level, like 80%.

Coming now to FIG. 7, which contains flow charts of processes for the transfer of session recording data and captured resource content data from the browser agents to monitoring servers.

Process 700 is directed to the transfer of session recording data in form of session capture records 230 and starts with step 701, when conditions triggering sending of session recording data by the browser agent, like an indication that the currently displayed content document is about to be unloaded occurred. Following step 702 then sends the session capture records stored in the session recording data storage 306 to the server agent 128 and subsequent step 703 clears the session recording data storage.

In following step 704 the server agent forwards received session recording data to the monitoring server. In some variant embodiments, step 702 may send the session recording data directly to the monitoring server. In this case, step 704 is skipped. The process then ends with step 705.

Sending of captured resource content in form of resource content capture records, from browser agents to monitoring servers is described in process 710. The process starts with step 711, when a condition for sending captured resource data has occurred. Following step 712 then sends the resource content capture records that are currently stored in the resource content capture data storage 313 to a server agent, or directly to a monitoring server. Afterwards step 713 is executed, which clears the resource content capture data storage. Step 714 is executed if the resource content capture records are sent to a server agent. In this step, the resource content capture records are forwarded from the server agent to the monitoring server. Step 714 is skipped if the browser agent sent the resource content capture data directly to the monitoring server. The process then ends with step 715.

Captured resource content data may be large in storage size and the time to transfer such large files may be too long to be performed in reaction of an indication that the current content is going to be unloaded or that the browser process is going to be terminated. To overcome these issues, some embodiments may, instead of storing resource content capture data in a buffer for bulked transfer, transfer captured resource content data immediately after the resource content was captured instead of buffering it on the browser.

The processing of received session recording and resource content capturing data by the monitoring server is described in FIG. 8.

Process 800 describes the processing of received resource content capturing data, in form of resource content capture records 250, by the monitoring server. The process starts with step 801, when a resource content capture records 250 is received. Following step 802 stores the received resource content capture record in the resource content data repository 150 of the monitoring server. Subsequent step 803 queries the RCARI 160 for a resource status record 161 with a resource content identifier 162 that matches the resource content identifier 251 of the received resource content capture record 250. If no matching resource status record is found, a new one is created, its resource content identifier 162 is set to the resource content identifier 251 of the received resource content capture record 250 and the created resource status record is stored in the RCARI.

Following step 804 updates the queried or created resource status record by setting its captured flag 171 to true, setting its resolve date 164 to the current date, setting its size 165 according to the storage size of the receives resource content, and setting its resource type 163 according to type data contained in the resource metadata section 253 of the receives resource content capture record.

The process then ends with step 805.

Process 810 describes the processing of received session recording data, in form of session capture records 230, by the monitoring server.

The process starts with step 811, when a session capture record 230 is received. Following step 812 may store the received session capture record in the session recording data repository 144, and in subsequent step 813 the anomaly analyzer 142 may analyze the received session capture record to determine whether it contains some abnormal conditions, like errors or performance degradations that occurred during the execution of the session, or if it contains user interaction patterns that indicate a poor user experience, like "rage clicks" (fast sequences of clicks on the same user interaction element). As mentioned earlier, browser agents may perform pre-analysis steps during session capturing and the anomaly analyzer may base its anomaly analysis on the results of those pre-analysis steps. Session recordings which are identified as containing abnormal or unexpected events or unexpected user interaction patterns may be reported to users or operators of the monitoring system.

Following step 814 may then extract the resource content ids for resources referred by the recorded session from the session capture record. Step 814 may either parse through captured document change data 223 of user interaction capture records 220 contained in the session capture record to detect contained resource loading directives and to extract the resource content identifiers added to them by the resource request directive processor 307 of the browser agent recording the session, or it may use the resource content identifiers 227 stored in resource load directive records 226 of the user interaction capture record 220, if they are available.

Following optional step 815 may then remove duplicate resource content identifiers from the resource content identifiers extracted by step 814. Step 815 may be omitted if the number of resource references that occurred within one recorded session are considered relevant for the determination of demand and deny lists. If only data specifying whether a resource was referred during a recorded session or not is required to define demand and deny lists, step 815 may be executed and remove duplicates.

Afterwards, step 816 may for each extracted resource content identifier, query the RCARI 160 for a resource status record 161 with a matching resource content identifier 162. For resource content identifiers for which no matching resource status record is found, a new one may be created using the respective resource content identifier. The created resource status record may be stored in the RCARI.

Following step 817 may then create a reference data point 168, using the recording date of the received session as reference date 169, and the result of the anomaly detection performed for the received session by step 813 to set the type 170 of the reference data point.

Step 818 may then add the created reference data point to the session reference data section 167 of each resource status record selected or created by step 816. The process then ends with step 819.

Updating the RCARI 160 on receipt session recording and resource capturing data is described in FIG. 8 also requires metadata describing resources. This metadata includes the memory size of the resources or the type (image, script, or style/format definition) of the resources. This metadata may be determined by the browser agent 113 and then sent to the monitoring server as part of resource content capture records 250 or of session capture records 230. The browser agent may analyze the type of reference used to refer a resource (e.g., in HTML documents <img/> tags to refer to image files, <script/> tags to refer to script files or <link rel="stylesheet"/> for styling/formatting definitions) to determine the type of a referred resource, and it may also determine the memory size of the referred resource. All of the resource metadata determined by the browser agent may either be sent in resource content capture records 250 and in session capture records 230, or the metadata may be divided between both types of monitoring data. As an example, the type of a resource may only be sent with session capture records and the memory size may only be sent with resource content capture records 250, or vice versa. In some embodiments, no resource metadata may be determined and sent by browser agents. In these embodiments, a pre-analysis step may analyze received session capture records to identify contained resource load directives/resource references to determine the type of the referred resource (e.g., by analyzing the HTML tag used to refer to the resource). This pre-analysis step may also analyze received contend capture records to determine the memory size of referred resources by analyzing received captured resource content data 254.

Some embodiments may also support the protection of private end-user data, like resources. Rules may be defined in such embodiments for the identification of resources that contain private end-user data. As an example, location patterns for folders or directories containing private user images may defined. Resources that are loaded from folders or directories that match those patterns may not be captured by the browser agent. The browser agent may add metadata for references to such private resource files that identifies them as private resources for which content should not be captured. If references to such resources that are tagged as containing private end-user data are received by the monitoring server, a corresponding resource capture record 161 may be added to the RCARI, but contrary to not-private resources, the capture flag 171 for the resource capture record the referred private resource may be set to indicate that the content of the resource was already captured. By immediately setting the captured flag for private resources, it is ensured that resource content identifiers for those private resources are never added to demand lists.

Referring now to FIG. 9, which describes the calculation and distribution of demand and deny lists by a monitoring server.

Deny lists may be created and distributed as described by process 900. The process starts with step 901, when a new deny list is required, e.g., when a specific time since the last creation of a deny list has elapsed, or if the number resources for which content was captured multiple times exceeds a certain threshold. Following step 902 selects the resource status records 161, with set captured flag 171 from the RCARI 160. Subsequent step 903 may then sort the resource status records selected by step 902 according to their relevancy for a deny list. Step 903 may sort the resource status records by the number of reference data points 168 contained in their session reference data section 167, or it may calculate a transfer size weight for each session reference data by multiplying their resource size 165 by their number of data points and sort them according to their transfer size weight.

Following step 904 may then select a subset of resource status records (e.g., first $10^3$ or $10^6$ records) with highest deny list relevancy (highest number of reference data points or highest transfer size weight) and use the resource content identifiers 162 of those resource status records to create a global deny list 185. The resource content identifiers 187 contained in the global deny list may be sorted according to the deny list relevancy of their respective resource status records.

Step 905 then distributes the global deny list to server agents 128 that are connected to the monitoring server 140. The server agents may use the received deny lists to create or update browser agent configuration records as shown in FIG. 4. The process then ends with step 906.

The creation of demand lists is described in process 910. The process starts with step 911, when a new demand list is required, e.g., when a specific time since the last update of the demand list has elapsed, or if the number of resources that are listed on the demand list for which content has already been resolved exceeds a certain threshold.

Following step 912 may then select all resource status records 161 from the RCARI 160 with a not set captured flag 171.

Subsequent step 913 may calculate a demand list relevancy score for each selected resource status record. Various input parameters may be used to calculate this score, like the number of reference data points 168 contained in the session reference data section 167 of the selected resource status records, where a lower numbers, which indicate seldomly referred resources, may increase the score, the number of reference data points indicating references from an abnormal session (type 170 of the reference data point indicates a reference from an abnormal session), where a higher number of abnormal session references increases the score, because the probability of being replayed is higher for sessions that are marked as abnormal, the state of the replay failed flag 166, where a set replay failed flag, which indicates that resolving of the resource content already failed during a replay of a session referring the resource, increases the score, or the type of the described resource, where a type indicating a media resource, like image or sound files may decrease the score because such resources only have local impact on the replay experience and may be substituted, and a type indicating a code or configuration resource, like script or style definition files may increase the score because those types of resources cannot be substituted. If such data is available, also the number of different recorded sessions referring a resource may be used as input parameter to calculate the demand list relevancy score, where a high number of different referring sessions may increase the score, as resources used by a high number of sessions should be resolved with priority. Various methods may be used to calculate a demand list relevancy score based on above described input parameters. On example method may normalize all input parameters with theoretically unlimited growth (e.g., for number of reference data points, determine max. number of reference data points of resource status records in RCARI and divide number of reference data points of resource status records by this max. number to get values in the value range from 0 to 1), and to map all rank based inputs (e.g., type of resource) to a numeric value and then combine the normalized/mapped values by summing or multiplying them.

Step 914 may then sort the selected resource status records according to their demand list relevancy score and following step 915 may select a subset ($10^3$ to $10^6$ records) of the selected resource status records with highest demand list relevancy score. The resource content identifiers of the resource status records selected by step 915 may be used to create a new global demand list 186, which is sorted according to the demand list relevancy score.

Following step 916 may then distribute the global demand list to connected server agents for creation of browser agent configuration records as described in FIG. 4. The process then ends with step 917.

Coming now to FIG. 10, which shows various processes related to the removal of no more required session recording and resource content capturing data. To control and limit storage requirements for monitoring data, monitoring systems define tenure times for monitoring data after which it is deleted. Exemplary tenure times include 14 days, one month, or a half year. For unrelated monitoring data, like data points of time series, this deletion is simple, all data points that are older than the tenure time can be deleted.

For related monitoring data, like session recording data that refers captured resource content, identifying monitoring data that can be deleted is more difficult, because a resource content that was captured earlier than tenure time may be referred in a currently recorded session. In addition, auxiliary data to control the creation of monitoring data, like deny and demand lists, need to be kept consistent with deleted monitoring data.

Deletion of no longer needed session recording data is described by process 1000. The process may be executed cyclically, e.g., every day and starts with step 1001. Following step 1002 may select all session capture records stored in the session recording data repository 144 that are older than the tenure time and delete them. The process then ends with step 1003.

Scheduled cleanup of resource capturing data is described by process 1010, which may also be executed cyclically, e.g., every day and which starts with step 1011. Following step 1012 selects resource content capture records 250 stored in the resource content data repository 150, which are older than the tenure time as delete candidate set. Following step 1013 identifies those resource content capture records contained in the delete candidate set for which a corresponding resource status record 161 exists in the RCARI 160 and removes them from the delete candidate set. Step 1014 then deletes the resource content capture records 250 that are still contained in the delete candidate set from the resource content data repository 150. The process then ends with step 1015.

A storage size triggered deletion of resource content data is described by process 1020. The process may be started with step 1021, when the storage size of the resource content repository 150 exceeds a certain threshold. Following 1022 may calculate a delete score for the currently stored resource content capture records 250 based on their reference count and on the data of their last recorded reference. A high reference count may decrease the delete score and an old date of the last recorded reference may increase the delete score.

Step 1023 may then adapt the delete scores calculated by step 1022 based on the type of the captured resources, where a type indicating a substitutable resource, like an image may increase the delete score and a type indicating a non-substitutable resource (script, style definition) may decrease the delete score.

Following step 1024 may then delete resource content capture records 250 according to their delete score (starting with highest delete score) until the storage size of the resource content data repository 150 is below the threshold. Step 1024 may, for deleted resource content capture records 250, query corresponding resource status records 161 from the RCARI 160. For existing corresponding resource status records, the captured flag 171 is cleared. The process then ends with step 1025.

The cleanup of the RCARI 160 is shown in process 1030. The process may be executed cyclically, e.g., every day and start with step 1031. Subsequent step 1032 may then identify and delete those resource status records 161 which contain no reference data points 168 with a reference date 169 that is younger than the tenure time. Those resource status records are only referred by recorded sessions that are already deleted. Therefore, also those resource status records 161 can be deleted. Afterwards, step 1033 may remove reference data points 168 with a reference date 169 that is older than the tenure time from the session reference data 167 of the remaining resource status records. The process then ends with step 1034.

The cleanup of the resource identifier storage 311 of browser agents is shown in process 1040. The process may either be executed cyclically, or when storage shortage is detected on the browser in which the browser agent is operating and starts with step 1041. Following step 1042 may identify and delete resource identifier storage records 240 with a last requested date 242 that is older than the tenure time minus a tolerance time. Example tolerance times include 1 hour, 6 hours, or one day. If the process was triggered by a storage shortage, step 1043 is executed, which continues deleting resource identifier storage records 240 until the storage shortage is resolved. Step 1043 may delete resource identifier storage records according to their last requested date 242 and start with the oldest last requested date. If reference count data is available for resource identifier storage records, deletion of resource identifier storage records may be performed according to the reference count data, where resource identifier storage records with lower reference count are deleted first.

After the content of a resource has been resolved, it can be assumed that it stays in the resource content data repository 150 of a monitoring server at least during the tenure time of recorded sessions. Therefore, the time to live of deny list entries on a browser agent may be aligned with the storage or tenure time of recorded user interaction sessions.

The cleanup of browser-side aggregated demand lists is shown in process 1050. The process may be executed cyclically, e.g., every 1, 5 or 10 minutes, and start with step 1051. Following step 1052 may identify and delete entries of an aggregated demand list managed by the browser agent that were received earlier than a specific purge threshold. Exemplary purge thresholds include 30 seconds, 1 minute or 5 minutes. The process then ends with step 1053. As multiple browser agents receive demand lists and resolve demanded resource content, demand lists may change more frequently than deny lists. Therefore, also a "time to live" for demand list entries stored on browser agents may be shorter than for browser agent-side stored deny list entries.

As the set of resources for which content is required changes with received session recording (adds resources to set) and resource content capturing (removes resources from set) data, the tenure time of browser agent-side accumulated demand list entries may be related to the average time that elapses between the receipt of two consecutive resource content capturing records or two consecutive session recording data records from one browser agent.

The replay of a stored session capture record 230 by the session replay module 147 of a monitoring server 140 is shown in FIG. 11.

The replay process 1100 starts with step 1101, when the replay module 147 receives a request to replay a specific recorded session, where the replay request contains data to identify the recorded session that was selected for replay, e.g., in form of session identification data 232.

Following step 1102 may then fetch the session capture record 230 matching the session identification data contained in the session replay request from the session recording data repository 144, and subsequent step 1103 selects the first user interaction capture record 220 contained in the user interaction capture list 235 of the fetched session capture record as current user interaction capture record.

Step 1104 may then identify resource load directives contained in document change data 223 of the current user interaction capture record. Step 1104 may in some embodiments parse through the document change data to identify portions of the change data that represent resource request (e.g., for HTML, "<img>" or "<link>" tags for resource load directives that load images or other resources like style sheets). Step 1104 may also use resource load directive records 226 contained in the resource loading data list to identify those resource load directives.

Following step 1105 may then identify those resource load directives that were marked during the recording process as containing user-private data. Resource content for such resource load directives may not have been captured to protect end-user privacy. Step 1105 may use metadata added to captured resource load directives during the recording process, like privacy flags, to identify those resource load directives. Step 1105 may then create substitute resource content data for identified privacy protected content, e.g., in form of blank image files which may be used instead of the original, not captured resource content. Step 1105 may use captured resource metadata, like the image size, or similar, to create appropriate replacement content.

Step 1106 may then adapt the location data of identified resource load directives that were not identified by step 1105 as referring privacy protected resource data to refer to resource data stored in the resource content data repository 150 instead of referring to the original location of the content.

As a simplified example, a monitoring server 140 may make captured resources stored in its resource content data repository 150 available via a basis access point "monitoring". An identified resource load directive may contain a resource origin of "myApplication/myStyle_3451", where "myApplication" may absolutely refer to the location from which the monitored application loads resource files, "myStyle" refers to the name of the loaded resource file and "_3451" is the resource content identifier that was appended by the browser agent during the recording process. Captured resource content may be accessible from the resource content access point via their content-tagged file name, in this case "myStyle_3451". Therefore, step 1406 may change the resource origin from "myApplication/myStyle_3451" to "monitoring/myStyle_3451" to redirect the resource loading directive to the captured version of the resource content that was used during recoding of the session.

Following decision step 1107 may check whether the resource content data repository 150 contains the desired captured resource content. In case the requested captured resource content is not found, step 1109 is executed, which tries to load the resource content form its original location (for the example described above, this would be the URL without appended resource content identifier, "myApplication/myStyle"). In case step 1108 fails, an error message describing the error conditions may be logged and substitute content may be created and used instead of original content. In addition, the replay failed flag 166 of the resource status record representing 161 the resource for which content resolution failed may be set.

Step 1108 is executed if resource content resolving from the resource content data repository 150 was successful or otherwise after step 1109, which renders the current state of the content document as stored in the document change data 235 of the current user interaction capture record 230 using the resolved resource content. Step 1108 may use substitute content created by step 1105 for resources referring private resource content. A browser window may be created by step 1108, where the browser window may be adapted to browser environment description data 233 stored in the session capture record 230 to create a browser environment that matches the conditions under which the session was recorded.

Following decision step 1110 may then determine whether the user interaction capture list 235 of the processed session capture record 230 contains subsequent user interaction capture records 220 and end the process with step 1112 if no subsequent user interaction capture record is available.

Otherwise, step 1111 is executed, which determines the time that elapsed between the recording of the current user interaction capture record 220 and the next user interaction capture record in the user interaction capture list 235 (e.g., by analyzing and comparing the interaction timing data 224 of both records) and waits a time that is proportional to the determined elapsed time. Afterwards, step 1111 may select the next user interaction capture record as current user interaction capture record and the process may continue with step 1104.

Coming now to FIG. 12 which proposes processes for an automated update of demand and deny list, based on monitored efficiency of those lists. For demand lists, the fraction of resources contained in the demand list for which content was already resolved may be monitored, and if this fraction exceeds a certain threshold, a new demand list may be created.

Deny lists are based on the assumption that a small subset of all resources referred by recorded sessions receive the majority of references. As an example, a monitored application may refer about 100 different resources in total. Out of those 100 resources, only 10 to 15 may receive 70 to 80 percent of all references. It is desired to have those at least 15 "heavy hitter" resources on the deny lists to efficiently reduce resource capturing related monitoring overhead. The distribution of resource references that occurred in recorded sessions may be monitored to identify changes of the "heavy hitter" set of resources and to update the deny list if the observed change of the "heavy hitter" set exceeds a certain threshold.

Process 1200 describes the updating of demand lists based on the fraction of already resolved entries contained in the demand list. The process may be executed cyclically, e.g., every 1 to 10 minutes and starts with step 1201. Following step 1202 may then determine the fraction of resources that are contained in the currently deployed demand list that are already resolved. A copy of the deployed demand list may be kept on the monitoring server, and each entry of this server-side copy of the demand list for which resource content was resolved may be flagged as resolved. Step 1202 may then compare the total number of entries on the server-side demand list with the number of already resolved entries to determine the portion of already resolved resources on the demand list.

Following decision step 1203 may then compare this portion with a specific threshold (e.g., 60% or 80%) and execute step 1204 if the portion of resolved resources exceeds the threshold. Otherwise step 1203 continues with step 1205, which terminates the process.

Step 1204 triggers an update of the demand list, e.g., as described in process 910 and the process afterwards ends with step 1205.

The update of deny lists is described in process 1210, which may be executed cyclically, with a low execution frequency like ever 12 hours or every day. The process starts with step 1211 and following step 1212 may calculate a hit rate for resources contained in the deny list. Step 1212 may calculate this hit rate for all entries of the deny list. Variant embodiments may calculate this hit rate only for those entries which were previously identified as "heavy hitters" (i.e., set of resources that received 70 to 80 percent of recorded resource references). Step 1212 may also use a server-side copy of the currently deployed deny list to identify resources that are currently on the deny list. Step 1212 may analyze recorded sessions of a specific observation period (last 1, 2 or 6 hours) and count the number of all resource references and the number of resource references that refer a resource that is listed on the deny list, or in some variants, only the number of references of resources that are also identified as "heavy hitters". Step 1212 may then divide the number of resource references directed to deny list entries (or the number directed to "heavy hitter" entries) by the number of all resource references to get a relative hit rate for the deny list (or "heavy hitters").

Following decision step 1213 may then compare the hit rate calculated by step 1212 to a minimum hit rate threshold (e.g., 60 to 50%) and execute step 1214 in case the hit rate is below the threshold. Otherwise, the process is terminated with step 1215.

Step 1214 triggers an update of the deny lists, as described in process 900. In variant embodiments which only consider "heavy hitter" resources to calculate a hit rate, step 1214 may also trigger a recalculation of the "heavy hitter" resources.

The process then ends with step 1215.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for reconstructing user interactions with an application executing on a computing device in a distributed computing environment, comprising:

capturing, by a browser agent, session data for user interactions with the application, where the session data incudes an identifier for a user interface element interacted with during a given user interaction, and the browser agent is instrumented in content provided by the application;

storing a list of available resource files on the computing device;

identifying, by the browser agent, one or more resource files referred to by the content; for each of the one or more resource files, determining, by the browser agent, an identifier for content of a given resource file;

sending, by the browser agent, the session data over a computer network to a monitoring server;

for each of the one or more resource files, determining, by the browser agent, whether a particular resource file is on the list of available resources files using an identifier for the particular resource file, and sending the particular resource file to the monitoring server in response to a determination that the particular resource file is absent from the list of available resource files;

maintaining a repository of resource status records, where each resource status record identifies a different resource file accessed during an earlier user interaction;

calculating a relevancy score for each resource file having a resource status record in the repository;

selecting a subset of resource status records from the repository based on the relevancy scores;

creating a global list of available resource files from the selected subset of the resource status records; and updating a given resource status record in the repository, where the given resource status record corresponds to the particular resource file.

2. The method of claim 1 further comprises adapting a reference to the given resource file using the identifier for the content of the given resource file and appending the adapted reference to the given resource file to the session data.

3. The method of claim 2 wherein adapting the reference to the given resource file comprises adding the identifier for the content of the given resource file to at least one of name of the given resource file or location of the given resource file.

4. The method of claim 1 wherein the identifier for the content of a given resource file is a hash value from a hash function applied to content of the given resource file.

5. The method of claim 1 wherein sending the particular resource file further comprises capturing, by the browser agent, content of the particular resource file in accordance with configuration data; and creating, by the browser agent, a resource content capture record for the content of the given resource file, where the resource content capture record includes the identifier for the content of the particular resource file and the content of the particular resource file.

6. The method of claim 1 further comprises storing a list of demanded resource files on the computing device; determining, by the browser agent, whether a particular resource file is on the list of demanded resources files using an identifier for the particular resource file; and sending the particular resource file to the monitoring server in response to a determination that the particular resource file is on the list of demanded resource files.

7. The method of claim 1 further comprises randomly selecting resource files from the global list of available resource files to form the list of available resource files and sending the list of available resource files to the browser agent.

8. The method of claim 1 further comprises calculating the relevancy score for each resource file based on number of occurrences a given resource file was accessed during earlier user interactions.

9. The method of claim 1 further comprises determining a type for each resource file and calculating the relevancy score for a given resource file based on the type of the given resource file.

10. The method of claim 1 further comprises determining whether an undesired event or user interaction pattern occurs during the given user interaction and assigning a demand relevancy score to resource files associated with the given user interaction, where the demand relevancy score for a given resource file is used to determine whether the given resource files is represented in the list of demanded resource files.

11. The method of claim 1 wherein each resource status record includes an indicator as to whether the content of the resource file has been previously captured and selects only resource status records for the subset of resource status records, where the indicator for the selected records indicates that the content of the resource file has been captured.

12. The method of claim 1 further comprises periodically deleting resource status records from the repository, where the deleted records having a timestamp older than a threshold.

13. The method of claim 1 further comprises sending the list of available resource files to select browser agents, where each of the select browser agents is configured to capture only content of resource files that are absent from the list of available resource files.

14. The method of claim 1 further comprises receiving, by the browser agent, the list of available resource files from the monitoring server, where the list of available resource files is sent over the computer network.

15. The method of claim 14 wherein each resource status record includes an indicator as to whether the content of the resource file has been previously captured and further comprises
selecting a subset of resource from the repository of resource status records, where the indicator for the selected records indicates that the content of the resource file has been captured; and
further comprises selecting a subset of available resource files from the repository of resource status records and generating the list of available resource files from the selected subset of available resource files.

16. The method of claim 1 further comprises reconstructing user interactions at the monitoring server with the application using the session data and the particular resource file.

17. The method of claim 16 where reconstructing user interactions at the monitoring server includes
receiving a session replay request; and
redirecting a request for a given resource file to content of the given resource file using the identifier for the content of the given resource file.

18. The method of claim 1 wherein the steps of maintaining a repository of
resource status records, calculating a relevancy score selecting a subset of resource status records, creating a global list of available resource files and updating a given resource status record are performed on the monitoring server.

19. The method of claim 1 wherein the steps of maintaining a repository of
resource status records, calculating a relevancy score selecting a subset of resource status records, creating a global list of available resource files and updating a given resource status record are performed by the browser agent.

20. A computer-implemented system having one or more processors for reconstructing user interactions with an application executing on a computing device in a distributed computing environment, comprising:
the application executing on the computing device;
a browser agent residing on the computing device and instrumented in content provided by the application; and
a server agent executing on a web server, wherein the server agent operates to send a list of available resource files to the browser agent;
wherein the browser agent is executed by the computing device to capture session data for user interactions with the application and send the session data over a computer network to a monitoring server, where the session data incudes an identifier for a user interface element interacted with during a given user interaction, and the browser agent is instrumented in content provided by the application;
wherein the browser agent is further executed by the computing device to identify one or more resource files referred to by the content; for each of the one or more resource files, determining an identifier for content of a given resource file; for each of the one or more resource files, determine whether a particular resource file is absent from the list of available resources files using an identifier for the particular resource file, and send the particular resource file to the monitoring server in response to a determination that the particular resource file is absent from the list of available resource files; and a repository of resource status records residing on the monitoring server, each resource status record identifies a different resource file accessed during an earlier user interaction, wherein the monitoring server calculates a relevancy score for each resource file having a resource status record in the repository; selects a subset of resource status records from the repository based on the relevancy scores; and creates the list of available resource files from the selected subset of the resource status records, wherein the monitoring server, upon receipt of the particular resource file from the browser agent, updates a given resource status record in the repository, where the given resource status record corresponds to the particular resource file.

21. The computer-implemented system of claim 20 wherein the browser agent adapts a reference to the given resource file using the identifier for the content of the given resource file and appends the adapted reference to the given resource file to the session data.

22. The computer-implemented system of claim 20 wherein the browser agent captures content of the particular resource file in accordance with configuration data and creates a resource content capture record for the content of the given resource file, where the resource content capture record includes the identifier for the content of the particular resource file and the content of the particular resource file.

23. The computer-implemented system of claim 20 wherein the server agent operates to send a list of demanded resource files to the browser agent; and the browser agent stores the list of demanded resource files on the computing device, determines whether a particular resource file is on the list of demanded resources files using an identifier for the particular resource file; and sends the particular resource file to the monitoring server in response to a determination that the particular resource file is on the list of demanded resource files.

24. The computer-implemented system of claim 20 wherein the monitoring server reconstructs user interactions by receiving a session replay request; and redirecting a request for a given resource file to content of the given resource file using the identifier for the content of the given resource file.

25. The computer-implemented system of claim 20 further comprises a second browser agent residing on the computing device, wherein the second browser agent is not configured to capture content of resource files, such that server agent operates to send the list of available resource files to the browser agent but does not send the list of available resource files to the second browser agent.

\* \* \* \* \*